(12) United States Patent
Otsuka

(10) Patent No.: US 8,837,790 B2
(45) Date of Patent: Sep. 16, 2014

(54) MEDICAL DIAGNOSIS SUPPORT DEVICE

(75) Inventor: Takeshi Otsuka, Tokyo (JP)

(73) Assignee: Olympus Corporation, Tokyo (JP)

( * ) Notice: Subject to any disclaimer, the term of this patent is extended or adjusted under 35 U.S.C. 154(b) by 1102 days.

(21) Appl. No.: 12/822,702

(22) Filed: Jun. 24, 2010

(65) Prior Publication Data

US 2010/0329522 A1 Dec. 30, 2010

(30) Foreign Application Priority Data

Jun. 25, 2009 (JP) ................................. 2009-151502
Jun. 21, 2010 (JP) ................................. 2010-140147

(51) Int. Cl.
*G06K 9/00* (2006.01)
*G06T 7/40* (2006.01)
*G06K 9/20* (2006.01)
*G06K 9/36* (2006.01)

(52) U.S. Cl.
CPC .............. *G06K 9/2027* (2013.01); *G06T 7/408* (2013.01); *G06K 9/2063* (2013.01); *G06T 2207/30024* (2013.01); *G06K 9/36* (2013.01)
USPC ........................................................ 382/128

(58) Field of Classification Search
USPC ........................................................ 382/128
See application file for complete search history.

(56) References Cited

U.S. PATENT DOCUMENTS

| | | | |
|---|---|---|---|
| 2006/0178833 A1* | 8/2006 | Bauer et al. ..................... | 702/19 |
| 2008/0074649 A1* | 3/2008 | Levenson et al. .............. | 356/73 |
| 2008/0285795 A1* | 11/2008 | Maddison et al. ............ | 382/100 |
| 2009/0087051 A1* | 4/2009 | Soenksen et al. ............. | 382/128 |
| 2010/0040266 A1* | 2/2010 | Perz et al. ..................... | 382/128 |

FOREIGN PATENT DOCUMENTS

JP 2003-126045 5/2003

* cited by examiner

*Primary Examiner* — Luke Gilligan
(74) *Attorney, Agent, or Firm* — Scully, Scott, Murphy & Presser, P.C.

(57) ABSTRACT

The present invention provides a medical diagnosis support device which enables a user to acquire the most appropriate information to support medical diagnosis without causing the user so much trouble. Specifically, the medical diagnosis support device comprises: an image processing method storage portion 152 for memorizing plural types of image processing methods; a photographing method storage portion 153 for memorizing plural types of photographing methods; an identification information acquisition portion 160 for acquiring identification information of a specimen S; an image processing method selection portion 141 for selecting, based on identification information thus acquired, a corresponding image processing method from the image processing method storage portion 152; a photographing method selection portion 142 for selecting, based on the acquired identification information or the image processing method thus selected, a corresponding photographing method from the photographing method storage portion 153; a specimen photographing portion 110 for photographing the specimen S according to the selected photographing method to acquire a specimen image; and an image processing portion 145 for subjecting the specimen image acquired by the specimen photographing portion 110, to image processing, according to the image processing method selected by the image processing method selection portion 141.

3 Claims, 24 Drawing Sheets

| R | G | R | G | — 116 |
| G | B | G | B | |
| R | G | R | G | |
| G | B | G | B | |

(b)

| R |   | R |   |
|   |   |   |   |
| R |   | R |   |
|   |   |   |   |

|   | G |   | G |
| G |   | G |   |
|   | G |   | G |
| G |   | G |   |

|   |   |   |   |
|   | B |   | B |
|   |   |   |   |
|   | B |   | B |

|  | Image processing method |
|---|---|
| Morphological observation | (None) |
| Comparison of stain region | Stain separation |
| Signal judgment | Signal intensification |
| ... | ... |

(b)

|  | Image processing method |
|---|---|
| HE stain | (None) |
| HE-VB stain | (None) |
| HE-DAB stain | Stain separation (3 stains) |
| CISH stain | Signal intensification |
| ... | ... |

(c)

|  | Image processing method |
|---|---|
| Lymph node | (None) |
| Mammary gland | (None) |
| Ovary | (None) |
| Womb | (None) |
| Colon | (None) |
| Soft tissue | (None) |
| Gullet | (None) |
| Kidney | (None) |
| Stomach | (None) |
| Prostate | (None) |
| Thyroid | (None) |
| Lung | Digital staining of elastic fiber |
| Parotid gland | (None) |
| ... | ... |

(d)

|  | Photographing method |
|---|---|
| Grade 0 | Shooting through 20× lens |
| Grade 1 | Shooting through 40× lens |
| Grade 2 | Shooting through 40× lens |
| Grade 3 | Shooting through 40× lens |
| Grade 4 | Shooting through 40× lens |

FIG. 8

| Image processing method | Lens magnification | Number of bands | Other |
|---|---|---|---|
| Not processed | | 3 bands | |
| Color normalization | ×20 | 6 bands | |
| Stain separation (2 stains) | ×40 | 6 bands | |
| Stain separation (3 stains) | ×40 | 9 bands | Shooting by 2-stage exposure |
| Signal intensification | ×60 | 3 bands | Shooting an image at plural depths differing by 3 μm from one another |
| Digital staining | ×40 | 16 bands | |
| ... | | | |

| | Quick | Normal | High Precision |
|---|---|---|---|
| Stain separation (3 stains) | Linear unmixing | Spectral estimation and pigment quantity estimation | Spectral estimation and pigment quantity estimation |
| Signal intensification | Linear unmixing | Spectral estimation and pigment quantity estimation | Spectral estimation and pigment quantity estimation |
| ... | | ... | ... |

(b)

| | Quick | Normal | High Precision |
|---|---|---|---|
| Stain separation (3 stains) | Shooting using 6 bands | Shooting using 9 bands 2-stage exposure | Shooting using 16 bands 2-stage exposure |
| Signal intensification | Shooting using 3 bands | Shooting using 3 bands | Shooting using 9 bands |
| | | Shooting an image at plural depths differing from one another by 3 μm | Shooting an image at plural depths differing from one another by 1 μm |
| ... | ... | ... | ... |

FIG. 10

| Image processing method | Image display method |
|---|---|
| Not processed | Normal |
| Color normalization | Normal |
| Stain separation (2 stains) | Display of stain separation |
| Stain separation (3 stains) | Display of stain separation |
| Signal intensification | Display of signal intensification |
| Digital staining | Display of digital staining |
| ... | ... |

FIG. 19

| Individual number | Staining method | Organ |
|---|---|---|
| A1001 | HE stain | Lymph node |
| A1002 | HE stain | Mammary gland |
| A1003 | HE·VB stain | Lymph node |
| A1004 | HE·VB stain | Mammary gland |

|  | Statistical data |
|---|---|
| Lymph node | Statistical data 1 |
| Mammary gland | Statistical data 2 |
| Ovary | Statistical data 3 |
| Womb | Statistical data 4 |
| Colon | Statistical data 5 |
| Soft tissue | Statistical data 6 |
| Gullet | Statistical data 7 |
| Kidney | Statistical data 8 |
| Stomach | Statistical data 9 |
| Prostate | Statistical data 10 |
| Thyroid | Statistical data 11 |
| Lung | Statistical data 12 |
| Parotid gland | Statistical data 13 |
| ... | ... |

(b)

|  | Spectra of pigments |
|---|---|
| HE stain | Spectra of H, E stain |
| HE·VB stain | Spectra of H, E, HB stain |
| HE·DAB stain | Spectra of H, E, DAB stain |
| ... | ... |

(c)

|  | Learning data |
|---|---|
| Lymph node | Learning data 1 |
| Mammary gland | Learning data 2 |
| Ovary | Learning data 3 |
| Womb | Learning data 4 |
| Colon | Learning data 5 |
| Soft tissue | Learning data 6 |
| Gullet | Learning data 7 |
| Kidney | Learning data 8 |
| Stomach | Learning data 9 |
| Prostate | Learning data 10 |
| Thyroid | Learning data 11 |
| Lung | Learning data 12 |
| Parotid gland | Learning data 13 |
| ... | ... |

FIG. 25

| Job number |
| --- |
| Identification information |
| Photographing method |
| Image processing method |
| Specimen image |
| Information obtained on the basis of image processing |
| Condition specified by a user |
| Display method |
| Diagnosis support information |

US 8,837,790 B2

MEDICAL DIAGNOSIS SUPPORT DEVICE

CROSS-REFERENCE TO RELATED APPLICATION

The present application claims priority from Japanese Application No. 2009-151502, filed on Jun. 25, 2009, the content of which is incorporated herein by reference.

BACKGROUND OF THE INVENTION

1. Field of the Invention

The present invention relates to a medical diagnosis support device, a virtual microscope system, and a specimen support member for use therewith, for acquiring information to support medical diagnosis from analysis of a specimen.

2. Description of Related Art

There has been known as one of pathological examination methods tissue diagnosis which makes diagnosis of a disease or examines how much a lesion site has grown by collecting tissue of the lesion site and observing it by a microscope. Such tissue diagnosis as this is also referred to as biopsy. It is widely practiced by biopsy to observe an enlarged view of a thin slice of several micron thickness, of a block specimen obtained from a removed organ and/or a pathological specimen obtained from needle aspiration biopsy by using a microscope, in order to analyze various pathological possibilities of a case. Above all, observation based on transmittance by using an optical microscope has been one of the most common observation methods because this method not only has a long history of application to observation but also only requires a device which is relatively cheap and easy to handle. In the case of this method of using an optical microscope, since a thinly sliced specimen fails to absorb or scatter the light and is almost colorless and transparent in its intact form, the specimen is generally stained with a dye before observation.

According to tissue diagnosis, a stained specimen is photographed to acquire a specimen image and then the specimen image is served for diagnosis by a doctor. However, when a doctor makes a diagnosis by just looking at a specimen image, his/her subject heavily influences the diagnosis. Therefore, in recent years, there has been developed a medical diagnosis support device for analyzing a specimen image obtained by photography to acquire various characteristic quantity, quantitatively judge the characteristics quantity and detect or classify lesion site, so that objective information is presented to a doctor.

Further, staining methods and analysis methods of a pathological specimen are progressing every year and there have been made proposals regarding various staining solutions, morphological analysis and staining analysis. It is easily anticipated that techniques of such staining methods and analysis methods based thereon as described above will continue to make progress in future. Accordingly, it is necessary to select the most suitable analysis method in accordance with a given staining method of a specimen in order to obtain appropriate information to support medical diagnosis.

However, some analysis methods such as "detection of cancer invasion" and "detection of signals" are specific to each particular medical diagnosis support device and thus a user cannot add or modify the analysis method in accordance with the content of a diagnosis. In view of this, there has been proposed in recent years a diagnosis support device capable of memorizing plural analysis methods (diagnosis support contents) to allow a user to optionally utilize a specific analysis method in accordance with an object or contents (e.g. JP 2003-126045).

Problems to be Solved by the Invention

According to the diagnosis support device disclosed by JP 2003-126045, a user can select for use a desired analysis method among plural stored analysis methods in accordance with an object or contents of a diagnosis.

However, a user must select a desired analysis method in the diagnosis support device described above. Therefore, considering a possible situation in future that there is prevalent a technique in which a large amount of specimens stained by various methods are automatically screened in accordance with a diagnosis, such a diagnosis support device as in JP 2003-126045 will impose on the user a burden of selecting an appropriate analysis method for every each specimen. Moreover, further considering that the user has to set parameters for each analysis method thus selected, the burden on the user is quite significant.

If a large amount of specimens can be classified according to the types of the analysis methods into cassettes and then processed, specimens of the same type can share the same image processing method including the same method of acquiring a specimen image and thus a user needs to carry out selection process of an image processing method only once for each type of the analysis methods. However, if specimens from various organs obtained by various staining methods have to be handled in the same batch in a relatively small hospital, an appropriate image processing method must be selected for each specimen, resulting in complicated selection process. Further, when specimens obtained by staining a series of sequential slices by different staining methods are processed in the same batch, a user has to select an appropriate image processing method for each specimen, resulting in complicated selection process. Yet further, since an image processing method is selected by a user, in a case where the user is a novice, in particular, a wrong processing method or a processing method which is not the most suitable may be selected, whereby a desirable result cannot be obtained.

SUMMARY OF THE INVENTION

Accordingly, a first object of the present invention contrived in view of the aforementioned situations, is to provide a medical diagnosis support device and a virtual microscope system, capable of automatically selecting an image processing method and a photographing method which are the most suitable for a specimen, to analyze the specimen without causing a user so much trouble.

Further, a second object of the present invention is to provide a virtual microscope system, capable of automatically selecting an image processing method and a photographing method which are the most suitable for a specimen, to analyze the specimen without causing a user so much trouble, whereby the system can assist the user in making a more accurate diagnosis than in the prior art.

In a first aspect of the present invention, in order to achieve the first object the invention, a medical diagnosis support device for analyzing a specimen, comprises: an image processing method storage portion for memorizing plural types of image processing methods; a photographing method storage portion for memorizing plural types of photographing methods; an identification information acquisition portion for acquiring identification information of the specimen; an image processing method selection portion for selecting, based on the identification information acquired by the identification information acquisition portion, a corresponding image processing method from the plural types of image processing methods stored in the image processing method storage portion; a photographing method selection portion for selecting, based on the identification information acquired by the identification information acquisition portion or the image processing method selected by the image processing method selection portion, a corresponding photographing method from the plural types of photographing methods stored in the photographing method storage portion; a specimen photographing portion for photographing the specimen according to the photographing method selected by the photographing method selection portion, to acquire a specimen image; and an image processing portion for subjecting the specimen image acquired by the specimen photographing portion, to image processing, according to the image processing method selected by the image processing method selection portion.

In a second aspect of the present invention, the medical diagnosis support device of the first aspect is characterized in that the specimen photographing portion comprises a multiband camera including an optical filter and a liquid crystal tunable filter or an acousto-optical tunable filter.

In a third aspect of the present invention, the medical diagnosis support device of the first or second aspect is characterized in that the photographing method storage portion memorizes plural types of photographing methods which differ from each other in any of the number of bands, the number of stages in multistage exposure, the number of images photographed at different depths, and a magnification rate.

In a fourth aspect of the present invention, the medical diagnosis support device of any one of the first to third aspects is characterized in that the image processing method storage portion memorizes plural types of image processing methods including any of image processing methods selected from the group consisting of stain separation process, digital stain process, signal intensifying process and color normalization process.

In a fifth aspect of the present invention, the medical diagnosis support device of the fourth aspect is characterized in that each of the plural types of image processing methods includes any of spectral estimation process, pigment quantity estimation process, and unmixing process.

In a sixth aspect of the present invention, the medical diagnosis support device of any one of the first to fifth aspects is characterized in that the identification information includes a barcode indicated on a support member of the specimen and the identification information acquisition portion is constituted of a barcode reader.

In a seventh aspect of the present invention, the medical diagnosis support device of any one of the first to fifth aspects is characterized in that the identification information includes character information and the identification information acquisition portion is constituted of a character reader.

In an eighth aspect of the present invention, the medical diagnosis support device of any one of the first to seventh aspects is characterized in that the identification information includes at least one of a method of making a diagnosis of the specimen, a staining method, an organ, and diagnostic information.

In a ninth aspect of the present invention, the medical diagnosis support device of any one of the first to eighth aspects, further comprises: a user requirement specifying portion for specifying a requirement regarding analysis of the specimen requested by a user; and a user requirement reflection portion for reflecting the user requirement specified by the user requirement specifying portion on selection of a photographing method by the photographing method selection portion or selection of an image processing method by the image processing method selection portion.

In a tenth aspect of the present invention, the medical diagnosis support device of the ninth aspect is characterized in that the user requirement includes a is requirement regarding processing time.

In an eleventh aspect of the present invention, the medical diagnosis support device of the ninth or tenth aspect is characterized in that the user requirement includes a requirement regarding precision of analysis.

In a twelfth aspect of the present invention, the medical diagnosis support device of any one of the first to eleventh aspects, further comprises a processing time calculation portion for calculating, based on the photographing method selected by the photographing method selection portion and the image processing method selected by the image processing method selection portion, predicted processing time required at least from the start of photographing of the specimen by the specimen photographing portion to the completion of image processing by the image processing portion.

In a thirteenth aspect of the present invention, the medical diagnosis support device of the twelfth aspect is characterized in that the processing time calculation portion is adapted to calculate remaining processing time, of the predicted processing time, during analysis of the specimen.

In a fourteenth aspect of the present invention, the medical diagnosis support device of the twelfth or thirteenth aspect, further comprises a processing time display portion for displaying the processing time calculated by the processing time calculation portion.

In a fifteenth aspect of the present invention, the medical diagnosis support device of any one of the first to fourteenth aspects, further comprises a communication portion for acquiring an image processing method to be stored in the image processing method storage portion or a photographing method to be stored in the photographing method storage portion, from a server via network.

In a sixteenth aspect of the present invention, the medical diagnosis support device of any one of the first to fifteenth aspects, further comprises a medical diagnosis support information acquisition portion for acquiring, based on information obtained by the image processing portion, information to support medical diagnosis for the specimen.

In a seventeenth aspect of the present invention, the medical diagnosis support device of the sixteenth aspect, further comprises a medical diagnosis support information transmission portion for transmitting the information to support medical diagnosis, acquired by the medical diagnosis support information acquisition portion, to a medical system sharing medical data.

In an eighteenth aspect of the present invention, the medical diagnosis support device of any one of the first to seventeenth aspects, further comprises: a display method storage portion for memorizing plural types of display methods; a display method selection portion for selecting, based on the image processing method selected by the image processing method selection portion, a corresponding display method from the plural types of display methods stored in the display method storage portion; and an image display portion for displaying, based on the display method selected by the display method selection portion, an image processed by the image processing portion.

In a nineteenth aspect of the present invention, the medical diagnosis support device of the eighteenth aspect is characterized in that the display method storage portion memorizes plural types of display methods including displaying an image by digital staining process.

In a twentieth aspect of the present invention, the medical diagnosis support device of the eighteenth or nineteenth aspect is characterized in that the display method storage portion memorizes plural types of display methods including displaying an image by signal intensifying process.

In a twenty-first aspect of the present invention, the medical diagnosis support device of any one of the first to twentieth aspects, further comprises a job data storage portion for memorizing job data for the specimen, the job data including the identification information acquired by the identification information acquisition portion, the photographing method employed by the specimen photographing portion, and the image processing method employed in image processing by the image processing portion.

In a twenty-second aspect of the present invention, the medical diagnosis support device of the twenty-first aspect is characterized in that the job data further includes a specimen image acquired by the specimen photographing portion and information obtained on the basis of image processing by the image processing portion.

In a twenty-third aspect of the present invention, in order to achieve the second object the invention, a virtual microscope system for photographing a specimen by using a microscope to obtain a specimen image and acquiring a virtual slide image of the specimen based on the specimen image thus obtained, comprises: an image processing method storage portion for memorizing plural types of image processing methods; a photographing method storage portion for memorizing plural types of photographing methods; an identification information acquisition portion for acquiring identification information of the specimen; an image processing method selection portion for selecting, based on the identification information acquired by the identification information acquisition portion, a corresponding image processing method from the plural types of image processing methods stored in the image processing method storage portion; a photographing method selection portion for selecting, based on the image processing method selected by the image processing method selection portion, a corresponding photographing method from the plural types of photographing methods stored in the photographing method storage portion; a specimen photographing portion for photographing the specimen according to the photographing method selected by the photographing method selection portion, to acquire a specimen image; an image processing portion for subjecting the specimen image acquired by the specimen photographing portion, to image processing, according to the image processing method selected by the image processing method selection portion; and a virtual slide image generation portion for generating a virtual slide image, based on the specimen image subjected to image processing by the image processing portion.

In a twenty-fourth aspect of the present invention, in order to achieve a third object of the invention, a medical diagnosis support device for analyzing a specimen, comprises: an image processing method storage portion for memorizing plural types of image processing methods; a photographing method storage portion for memorizing plural types of photographing methods; an identification information calculation portion for calculating identification information of the specimen from a specimen image for acquiring identification information, the specimen image being obtained by photographing the specimen according to a predetermined photographing method; an image processing method selection portion for selecting, based on identification information calculated by the identification information calculation portion, a corresponding image processing method from the plural types of image processing methods stored in the image processing method storage portion; a photographing method selection portion for selecting, based on the identification information acquired by the identification information calculation portion or the image processing method selected by the image processing method selection portion, a corresponding photographing method from the plural types of photographing methods stored in the photographing method storage portion; a specimen photographing portion for photographing the specimen according to the photographing method selected by the photographing method selection portion, to acquire a specimen image; and an image processing portion for subjecting the specimen image acquired by the specimen photographing portion, to image processing, according to the image processing method selected by the image processing method selection portion.

In a twenty-fifth aspect of the present invention, the medical diagnosis support device of the twenty-fourth aspect is characterized in that the specimen image for acquiring identification information is acquired by photographing the specimen at a relatively low magnification rate by the specimen photographing portion.

In a twenty-sixth aspect of the present invention, in order to achieve a fourth object of the invention, a medical diagnosis support device for analyzing a specimen, comprises: an image processing method storage portion for memorizing plural types of image processing methods; a photographing method storage portion for memorizing plural types of photographing methods; an identification information storage portion for memorizing an individual number and identification information of each of plural specimens; an identification information selection portion for reading an individual number of said specimen and selecting identification information corresponding to the individual number thus read, from the identification information stored in the identification information storage portion; an image processing method selection portion for selecting, based on the identification information selected by the identification information selection portion, a corresponding image processing method from the plural types of image processing methods stored in the image processing method storage portion; a photographing method selection portion for selecting, based on the identification information selected by the identification information selection portion or the image processing method selected by the image processing method selection portion, a corresponding photographing method from the plural types of photographing methods stored in the photographing method storage portion; a specimen photographing portion for photographing said specimen according to the photographing method selected by the photographing method selection portion, to acquire a specimen image; and an image processing portion for subjecting the specimen image acquired by the specimen photographing portion, to image processing, according to the image processing method selected by the image processing method selection portion.

In a twenty-seventh aspect of the present invention, in order to achieve a fifth object of the invention, a medical diagnosis support device for analyzing a specimen, comprises: an image processing method storage portion for memorizing plural types of image processing methods; a photographing method storage portion for memorizing plural types of photographing methods; a communication portion for effecting communication with a server via network; an identification information selection portion for selecting, from the server via the network by way of the communication portion, identification information corresponding to an individual number acquired from said specimen; an image processing method selection portion for selecting, based on the identification information selected by the identification information selection portion, a corresponding image processing method from the plural types of image processing methods stored in the image processing method storage portion; a photographing method selection portion for selecting, based on the identification information selected by the identification information selection portion or the image processing method selected by the image processing method selection portion, a corresponding photographing method from the plural types of photographing methods stored in the photographing method storage portion; a specimen photographing portion for photographing said specimen according to the photographing method selected by the photographing method selection portion, to acquire a specimen image; and an image processing portion for subjecting the specimen image acquired by the specimen photographing portion, to image processing, according to the image processing method selected by the image processing method selection portion.

In a twenty-eighth aspect of the present invention, in order to achieve a sixth object of the invention, a medical diagnosis support device for analyzing a specimen, comprises: an image processing method storage portion for memorizing plural types of image processing methods; a photographing method storage portion for memorizing plural types of photographing methods; an identification information acquisition portion for acquiring identification information of the specimen; an image processing method selection portion for selecting, based on the identification information acquired by the identification information acquisition portion, a corresponding image processing method from the plural types of image processing methods stored in the image processing method storage portion; a reference data storage portion for memorizing plural types of reference data; a reference data selection for selecting, based on the identification information acquired by the identification information acquisition portion and the image processing method selected by the image processing method selection portion, a corresponding reference data from the plural types of reference data stored in the reference data storage portion; a photographing method selection portion for selecting, based on the identification information acquired by the identification information acquisition portion or the image processing method selected by the image processing method selection portion, a corresponding photographing method from the plural types of photographing methods stored in the photographing method storage portion; a specimen photographing portion for photographing said specimen according to the photographing method selected by the photographing method selection portion, to acquire a specimen image; and an image processing portion for subjecting the specimen image acquired by the specimen photographing portion, to image processing, according to the image processing method selected by the image processing method selection portion and the reference data selected by the reference data selection portion.

In a twenty-ninth aspect of the present invention, the medical diagnosis support device of the twenty-eighth aspect is characterized in that the reference data storage portion memorizes plural types of reference data including any of reference data selected from the group consisting of statistical data for use in spectral estimation process, spectrum of a pigment for use in pigment quantity estimation, learning data for use in digital staining process or process for judging a specific region, and a reference value of pigment quantity for use in color normalization.

In a thirtieth aspect of the present invention, a specimen support member for use in the medical diagnosis support device of the first aspect, has a barcode in which at least one identification information selected from the group consisting of a diagnosis method, a staining method, an organ, and diagnostic information has been recorded.

In a thirty-first aspect of the present invention, a specimen support member for use in the medical diagnosis support device of the first aspect is characterized in that characters indicating at least one of a diagnosis method, a staining method, an organ, and diagnostic information are described thereon.

Effect of the Invention

According to the medical diagnosis support device of the present invention, an image processing method and a photographing method which are the most suitable for a specimen are automatically selected, whereby a specimen can be analyzed without causing a user so much trouble.

According to the virtual microscope system of the present invention, an image processing method and a photographing method which are the most suitable for a specimen are automatically selected, whereby it is possible to provide, without causing a user so much trouble, a virtual slide image which allows the user to make a more accurate diagnosis than in the prior art.

BRIEF DESCRIPTION OF THE DRAWINGS

FIG. 3(a) is a view schematically showing an example of arrangement of a color filter disposed in a RGB camera shown in FIG. 2.

FIG. 3(b) is a view schematically showing a pixel arrangement of respective RGB bands.

FIGS. 7(a) to 7(c) are views showing data structures of the image processing method tables shown in FIG. 1.

FIG. 8 is a view showing a data structure of the photographing method table shown in FIG. 1.

FIGS. 9(a) and 9(b) are views showing data structures of the user requirement table shown in FIG. 1.

FIG. 10 is a view showing a data structure of the image display method table shown in FIG. 1.

FIG. 19 is a view showing a data structure of the identification information storage table shown in FIG. 18.

FIG. 23 is a view showing a data structure of the reference data shown in FIG. 22.

FIG. 25 is a view showing an example of job data structure, which explains a modified example of the present invention.

DESCRIPTION OF THE PREFERRED EMBODIMENTS

Figure 1:
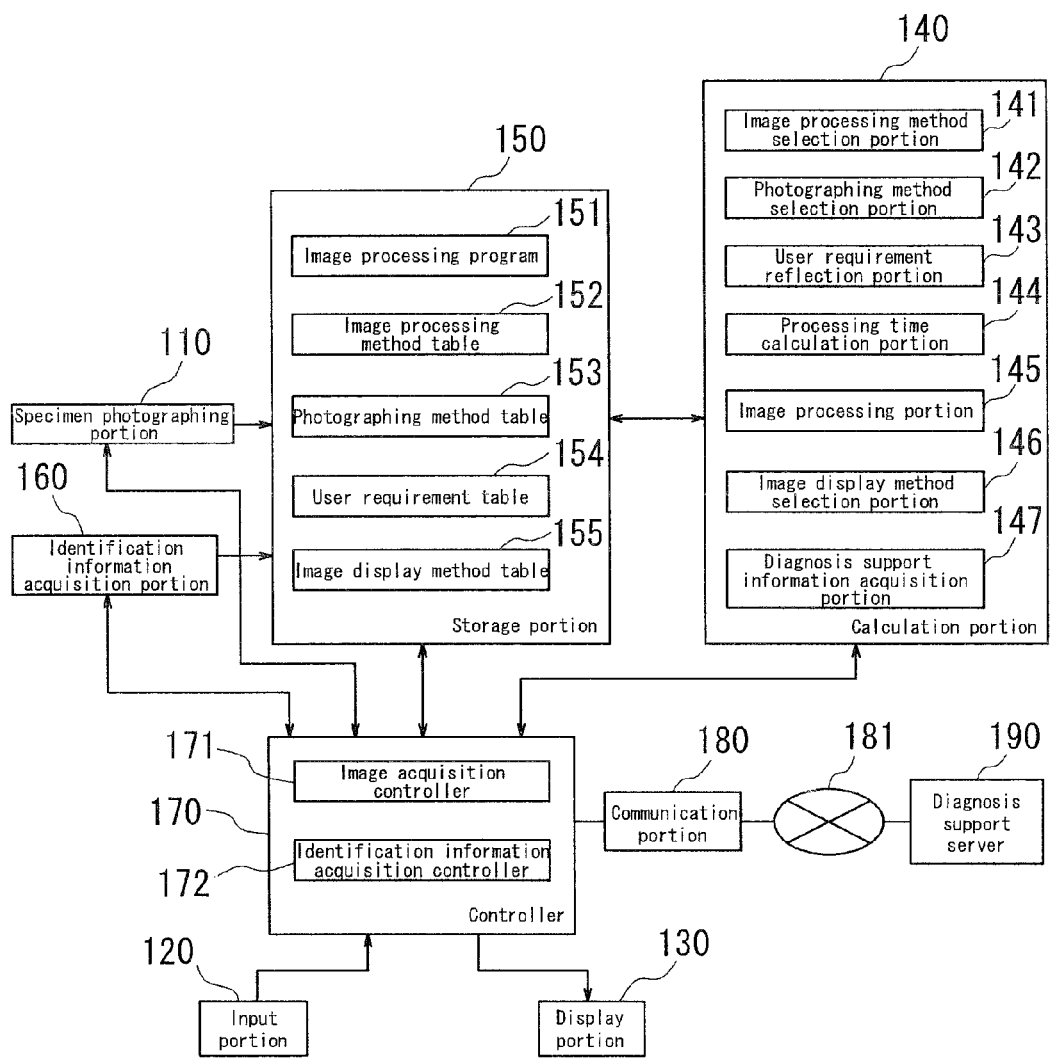
FIG. 1 is a block diagram showing a functional constitution of main parts of a medical diagnostics support device according to a first embodiment of the present invention.

In this application, the term "photographing" means capturing image, unless the context clearly indicates otherwise. A preferred embodiment of the present invention will be described in detail with reference to the drawings.
(First Embodiment)
FIG. 1 is a block diagram showing a functional constitution of main parts of a medical diagnostics support device according to a first embodiment of the present invention. The medical diagnosis support device is structured to include a computer such as a personal computer and provided with a specimen photographing portion 110 including a microscope, an input portion 120, a display portion 130, a calculation portion 140, a storage portion 150, an identification information acquisition portion 160, and a controller 170 for controlling the respective portions. The controller 170 is capable of communicating, by way of a communication portion 180, with a local medical system which shares medical data with the present medical diagnosis support device. The controller 170 is also capable of communicating with a diagnosis support server 190 or other external medical system by way of network 181.

Figure 2:
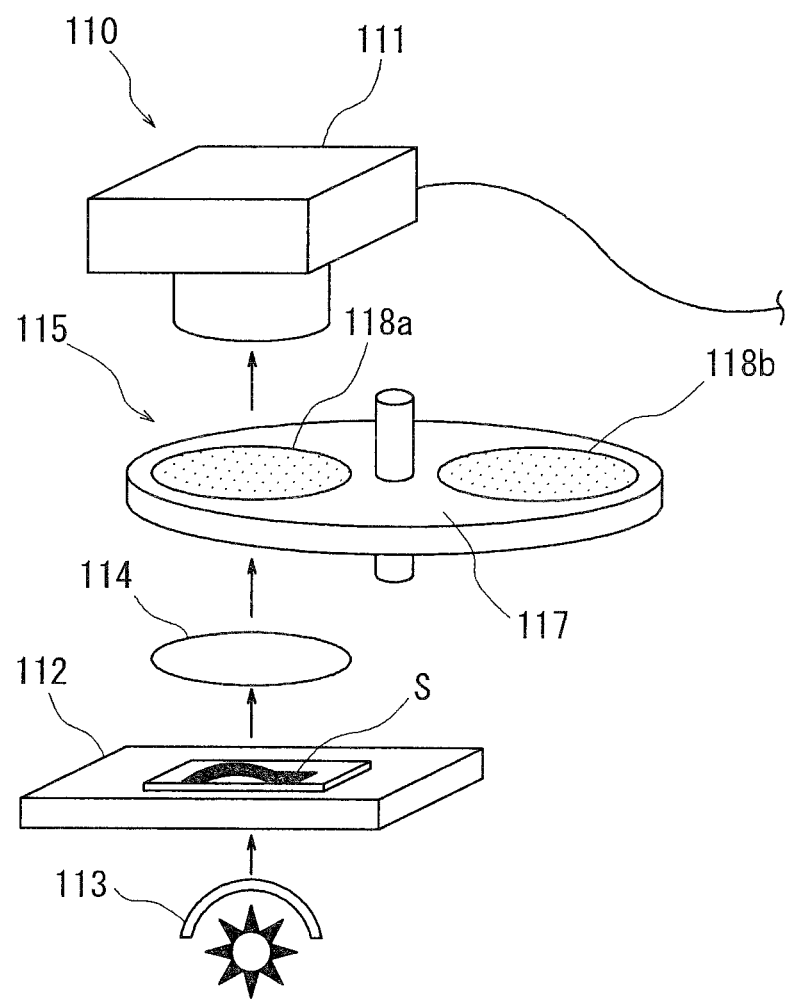
FIG. 2 is a schematic view showing a structure of the main parts of a specimen photographing portion shown in FIG. 1.

The image acquisition portion 110 acquires a multiband image of a target stained specimen (which specimen will be referred to as a "target specimen" hereinafter) by a microscope. FIG. 2 schematically shows a structure of an example of the specimen photographing portion 110 in a case where 6 band images are to be obtained. As shown in FIG. 2, the image photographing portion 110 includes: a RGB camera 111 equipped with an image pickup element such as CCD (charge coupled devices) or CMOS (complementary metal oxide semiconductor); a specimen holding portion 112 on which a target specimen S is placed; an illumination portion 113 for illuminating the target specimen S on the specimen holding portion 112 by transmitted light; an optical system 114 including a microscope object lens for concentrating transmitted light from the target specimen S for imaging; and a filter portion 115 for restricting a wavelength range of light to be imaged to a predetermined range.

The RGB camera 111 is one which is widely used in, for example, a digital camera, of a single panel type in which a RGB color filter 116 of Bayer Arrangement as shown in FIG. 3(a) is disposed on an image pickup element constituted of a monochrome two-dimensional sensor. The RGB camera 111 is disposed such that the center of an image to be photographed is located on the optical axis of illumination light. In the case of such a RGB camera 111 as described above, each pixel can photograph only one of the components R, G, B as shown in FIG. 3(b). However, insufficient R, G, B components are interpolated by utilizing other pixel values in the vicinity thereof. This technique is known in, for example, JP patent 3510037.

In a case where a RGB camera 111 of 3CCD (three-panel type) is used, the R, G, B components in each pixel can be acquired from the beginning. Either a single-panel or three-panel type camera may be used in the present embodiment. Hereinafter, it is assumed that respective R, G, B components have successfully been acquired in each pixel of an image photographed by the RGB camera 111. Further, it is assumed that the RGB camera 111 has spectral sensitivity characteristics of the respective R, G, B bands as shown in FIG. 4 when photographing is effected by illumination light propagating from the illumination portion 113 via the optical system 114.

Figure 4:
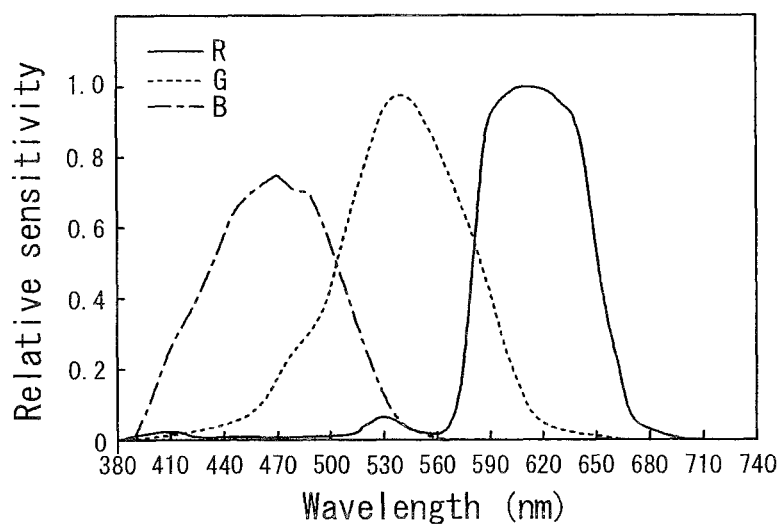
FIG. 4 is a view showing spectral sensitivity characteristics of the RGB camera shown in FIG. 2.
Figure 5:
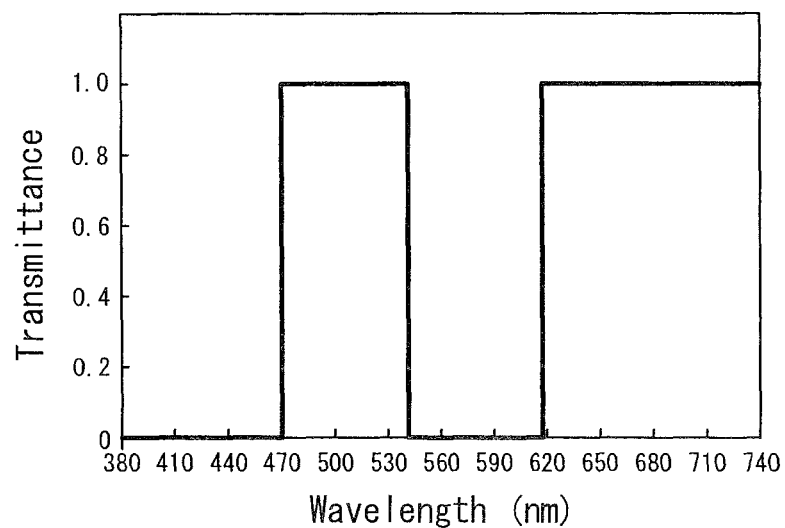
FIG. 5 is a view showing spectral transmittance characteristics of one of optical filters constituting a filter portion shown in FIG. 2.
Figure 6:
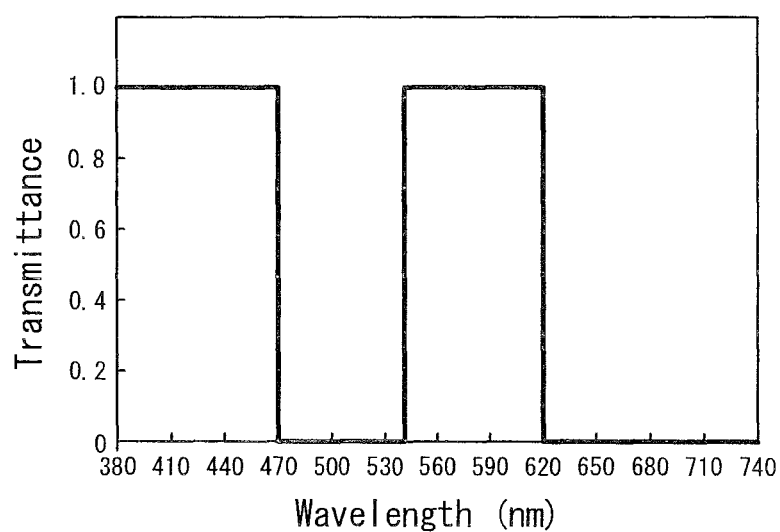
FIG. 6 is a view showing spectral transmittance characteristics of the other of optical filters constituting the filter portion shown in FIG. 2.

The specimen photographing portion 110 exemplarily shown in FIG. 2 acquires 6 band images by using the RGB camera 111 having spectral sensitivity characteristics as shown in FIG. 4. Accordingly, the filter portion 115 is provided with a carousel filter switching portion 117 which holds two optical filters 118a, 118b having different spectral transmittance characteristics such that these optical filters divide the transmitted wavelength region of each band of the components R, G, B into two. FIG. 5 shows the spectral transmittance characteristics of one optical filter 118a, and FIG. 6 shows the spectral transmittance characteristics of the other optical filter 118b.

The controller 170 at first causes, for example, the optical filter 118a to be positioned on the optical path extending from the illumination portion 113 to the RGB camera 111, the illumination portion 113 to illuminate the target specimen S placed on the specimen holding portion 112, and effects a first photographing by imaging the light transmitted via the optical system 114 and the optical filter 118a on an image pickup element of the RGB camera 111. Next, the controller 170 rotates the filter switching portion 117 such that the optical filter 118b is located on the optical path from the illumination portion 113 to the RGB camera 111, to effect a second photographing as in the first photographing.

As a result, images having three different bands are obtained from the first photographing and the second photographing, respectively, whereby multiband images having 6 bands are obtained.

The number of the optical filter provided in the filter portion 115 is not limited to two and it is possible to obtain an image having a larger number of bands by using three or more optical filters. Further, the filter portion 115 may be structured to acquire an image having a further larger number of bands by using a known liquid crystal tunable filter or an acousto-optical tunable filter. Yet further, the RGB camera 111 may be structured to acquire a two-dimensional specimen image by using an image pickup element constituted of a one-dimensional sensor having a RGB filter and moving this image pickup element, with scanning, in the direction orthogonal to the pixel arrangement direction.

The multiband image of the target specimen S acquired by the specimen photographing portion 110 (which image will be referred to as a "target specimen image" hereinafter) is stored as multiband image data in the storage portion 150.

The input portion 120 is constituted of various input devices such as a keyboard, a mouse, a touch panel, switches and the like and outputs information in accordance with an operation input to the controller 170. In the present embodiment, the input portion 120 is caused to function as a user requirement specifying portion, as well, to make a user specify via the input portion 120 one of processing modes including "Quick", "Normal" and "High Precision" as a user requirement or request when a target specimen is analyzed.

The display portion 130 is constituted of a display device such as a LCD (liquid crystal display) or EL (electro luminescence) display, a CRT (cathode ray tube) display or the like and displays various images, based on a display signal inputted from the controller 170.

The calculation portion 140 is constituted of hardware such as CPU and includes an image processing method selection portion 141, a photographing method selection portion 142, a user requirement reflection portion 143, a processing time calculation portion 144, an image processing portion 145, an image display method selection portion 146, and a medical diagnosis support information acquisition portion 147.

The storage portion 150 is realized by: various IC memory like a memory-updatable flush memory such as ROM or RAM; an information storage medium such as a CD-ROM and a hard disc installed or connected by way of a data communication terminal; and an information storage medium reading device. There are stored in the storage portion 150, data including: an image processing program 151 for operating the medical diagnosis support device of the present embodiment to realize various functions provided in the medical diagnosis support device; an image processing method table 152 for use when the image processing program 151 is executed; a photographing method table 153; a user requirement table 154; and an image display method table 155.

In the present embodiment, the image processing method table 152 constitutes the image processing method storage portion and stores, for example, data showing: a list of image processing methods associated with diagnosis methods as shown in FIG. 7(a); a list of image processing methods associated with staining methods as shown in FIG. 7(b); a list of an image processing methods associated with organs as shown in FIG. 7(c); and a list of photographing methods associated with grades of tumor as shown in FIG. 7(d). In the present embodiment, data of an image processing method corresponding to "Normal" mode of the user requirement specified by a user may be stored in the image processing method table 152. In FIG. 7(b), "HE stain" represents hematoxilin-eosin stain, "HE.VB stain" represents combination of HE stain and Victoria blue stain, "HE.DAB stain" represents combination of HE stain and diaminobenzidine staining, and "CISH stain" represents "Chromogenic In Situ Hybridization" staining.

The photographing method table 153 constitutes the photographing method storage portion and stores, for example, data showing a list of photographing method features such as the number of bands, the number of exposures in multistage exposure, the number of images photographed at different depths, a magnification rate in shooting, and the like, which features are associated with image processing methods, as shown in FIG. 8. In the present embodiment, as in the case of the image processing method table 152, data of image processing methods corresponding to "Normal" mode of the user requirement specified by a user may be stored in the photographing method table 153. That is, the larger number of bands enables acquisition of the more detailed spectral characteristics and the more precise image processing. However, the larger number of bands increases the required time and memory size of the storage portion 150 accordingly. Therefore, the number of bands is set at the appropriate value which is the most appropriate for "Normal" mode, depending on the selected image processing method. In the present embodiment, the number of bands is set, for example, at 3, 6 and 16 for morphological observation, staining separation process, and digital staining, respectively. Although the specimen photographing portion 110 in FIG. 2 is structured so as to obtain images of maximally six bands, the specimen photographing portion 110 may be structured so as to obtain images of a desired number of bands by using, for example, a tunable filter.

Regarding the number of exposures in multistage exposure, the larger number of exposures results in the more enhanced S/N but also the longer time and the larger required memory capacity. Therefore, the number of exposures is set to correspond to "Normal" mode in accordance with the number of the stain colors in the selected image processing method. In the present embodiment, one-stage exposure corresponds to two color-stained specimen and two-stage exposure corresponds to three-color-stained specimen. Similarly, the larger number of images photographed at different depths enables acquisition of 3-dimensional information of the higher precision but results in the longer time and the larger required memory capacity. Therefore, as in multistage exposure, the number of images photographed at different depths is set to correspond to "Normal" mode in accordance with the selected image processing method. In the present embodiment, a photographing method of photographing images at plural depths each differing by 3 μm is employed when the image processing method carries out signal intensifying process.

The user requirement table 154 stores data showing a list of image processing methods as shown in FIG. 9(a) and a list of photographing methods as shown in FIG. 9(b) each associated with respective modes of "Quick", "Normal" and "High Precision" specified by a user. The list of the image processing methods shown in FIG. 9(a) stores data executing, in the cases of stain separation and signal intensification, linear unmixing image processing in "Quick" mode and image processing based on spectral estimation and pigment quantity estimation in "Normal" and "High Precision" modes. Further, the list of the photographing methods shown in FIG. 9(b) stores data executing, in a case where the image processing method is stain separation, 6-band image shooting in "Quick" mode, 9-band image shooting by two-stage exposure in "Normal" mode, and 16-band image shooting by two-stage exposure in "High Precision" mode.

The user requirement table 154 shown in FIGS. 9(a) and 9(b) stores the data of "Normal" mode as described above. The data of the image processing method and the photographing method by "Normal" mode are the same as the contents of the image processing method table 152 shown in FIG. 7(b) and the contents of the photographing method table 153 shown in FIG. 8, respectively, in the present embodiment, either the data of "Normal" mode of the user requirement table 154 is eliminated or the user requirement table 154 is used as the image processing method table 152 or the photographing method table 153, as well, so that the image processing method table 152 or the photographing method table 153 is eliminated.

The image display method table 155 constitutes a display method storage portion and stores data showing a list of image display methods associated with image processing methods as shown in FIG. 10.

The associations or relationships exemplarily shown in FIGS. 7 to 10 are managed, for example, by using a known database administration tool. The data structures of the tables are not restricted to the shown examples and other structures are acceptable as longs as the structures enable, by specification of attribute values of respective attribute items, acquisition of characteristics data in accordance with the attribute values. The photographing methods and the image processing methods are periodically downloaded from the diagnosis support server 190 via the network 181 by the communication portion 180, so that a user can always address the latest image processing methods and photographing methods. Further, when a new photographing method or image processing method which is not available in the photographing method table 153 or the image processing method table 152 is found as a result of search by the diagnosis support server 190, the new method is downloaded, so that a user can instantly address a specimen obtained by a newly emerged staining method or diagnosis method.

The identification information acquisition portion 160 acquires identification information of a target specimen S and is constituted of, for example, a barcode reader or a character reader which reads a (one dimensional or two dimensional) barcode or characters indicated at an end of a slide supporting the target specimen S. In the present embodiment, identification information of a target specimen S includes a diagnosis method of the target specimen 5, a staining method by which the target specimen S is stained, or the name of the organ from which the target specimen S has been collected.

The controller 170 is constituted of hardware such as CPU. The controller 170 sends instructions, carries out transfer of data, and the like, to the respective portions constituting the medical diagnosis support device, based on an input signal inputted from the input portion 120, image data inputted from the specimen photographing portion 110, the program or data stored in the storage portion 150, and the like, to comprehensively control the entire operations. Further, the controller 170 has an image acquisition controller 171 for controlling operations of the specimen photographing portion 110 and acquiring a target specimen image and an identification information acquisition controller 172 for controlling operations of the identification information acquisition portion 160 and acquiring identification information of a target specimen image.

Figure 11:
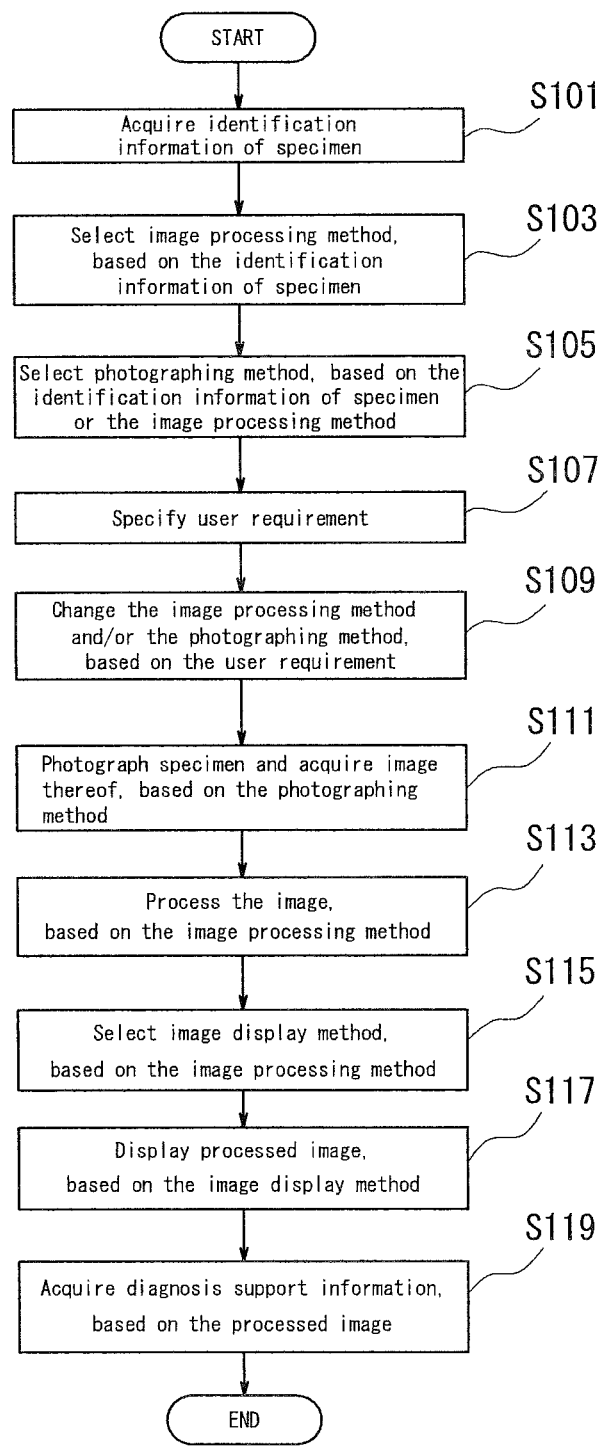
FIG. 11 is a flow chart showing outline of operations of the medical diagnosis support device shown in FIG. 1.

Hereinafter, the outline of operations of the medical diagnosis support device of the present embodiment will be described with reference to a flowchart shown in FIG. 11. The processes described below are executed by controlling operations of the respective portions of the medical diagnosis support device by the controller 170 according to the image processing program 151 stored in the storage portion 150.

First, the controller 170 controls operations of the identification information acquisition portion 160 by the identification information acquisition controller 172, whereby identification information of a target specimen S is acquired (step S101).

Figure 12:
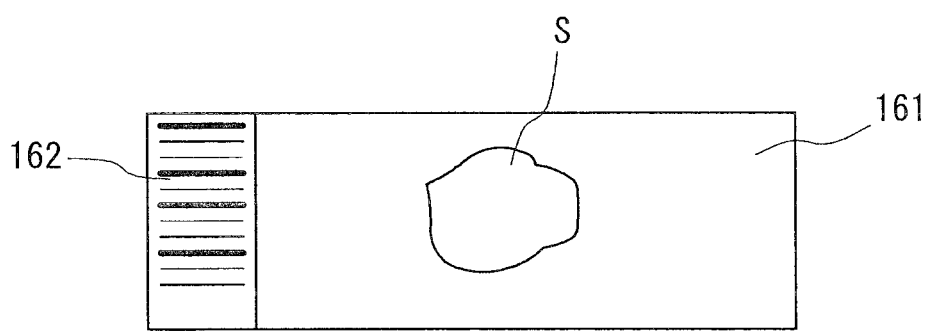
FIG. 12 is a view showing an example of identification information provided on a target specimen.

At this stage, for example, in a case where a barcode 162 recording identification information of the target specimen S is provided at an end of a slide (a supporting member) 161 supporting the target specimen S as shown in FIG. 12, the identification information acquisition portion 160 causes a barcode reader to read the barcode 162, to acquire identification information. FIG. 12 shows a case where a one-dimensional barcode 162 has been provided. In a case where identification information expressed by characters has been provided, the characters are read by a character reader, so that the identification information is acquired. The identification information of the target specimen S acquired by the identification information acquisition portion 160 is stored in the storage portion 150.

Next, the controller 170 causes the image processing method selection portion 141 of the calculation 140 to select an image processing method from the image processing method table 152 of the storage portion 150 based on the features of the diagnosis method, the staining method or the organ included in the identification information (step S103).

Examples of possible image processing methods to be selected include stain separation, digital staining, signal intensification, color normalization, and the like, as shown in FIGS. 7(a) to 7(c). The image processing method selection portion 141 then selects, in a case where the identification information is a diagnosis method, (i) "None" indicating that no image processing is to be carried out when the diagnosis method is morphological observation; (ii) stain separation process when the diagnosis method is stained region comparison; and (iii) signal intensifying process when the diagnosis method is signal judgment, as shown in FIG. 7(a). In a case where the identification information is a staining method, the image processing method selection portion 141 then selects (i) stain separation process when the staining method is HE.DAB stain because a combination of HE and DAB is normally impossible; and (ii) signal intensifying process when the staining method is CISH stain because then signal is to be judged, as shown in FIG. 7(b). In a case where the identification information is an organ, the image processing method selection portion 141 then selects an image processing method corresponding to the organ from the table shown in FIG. 7(c). The image processing method thus selected by the image processing method selection portion 141 is stored in the storage portion 150. As described above, image processing corresponding to "Normal" mode of the user requirement specified by a user is set as the image processing by the image processing method selected from the image processing method table 152.

Next, the controller 170 causes the photographing method selection portion 142 to select a photographing method corresponding to "Normal" mode from the photographing method table 153 of the storage portion 150 based on the image processing method selected by the image processing method selection portion 141 (step S105). The photographing method thus selected is stored in the storage portion 150.

Thereafter, the controller 170 receives via the input portion 120 the user requirement specified by a user (step S107) and determines the image processing method and the photographing method thus selected or changes the image processing method and/or the photographing method by the user requirement reflection portion 143, based on the specified user requirement (step S109).

Figure 13:
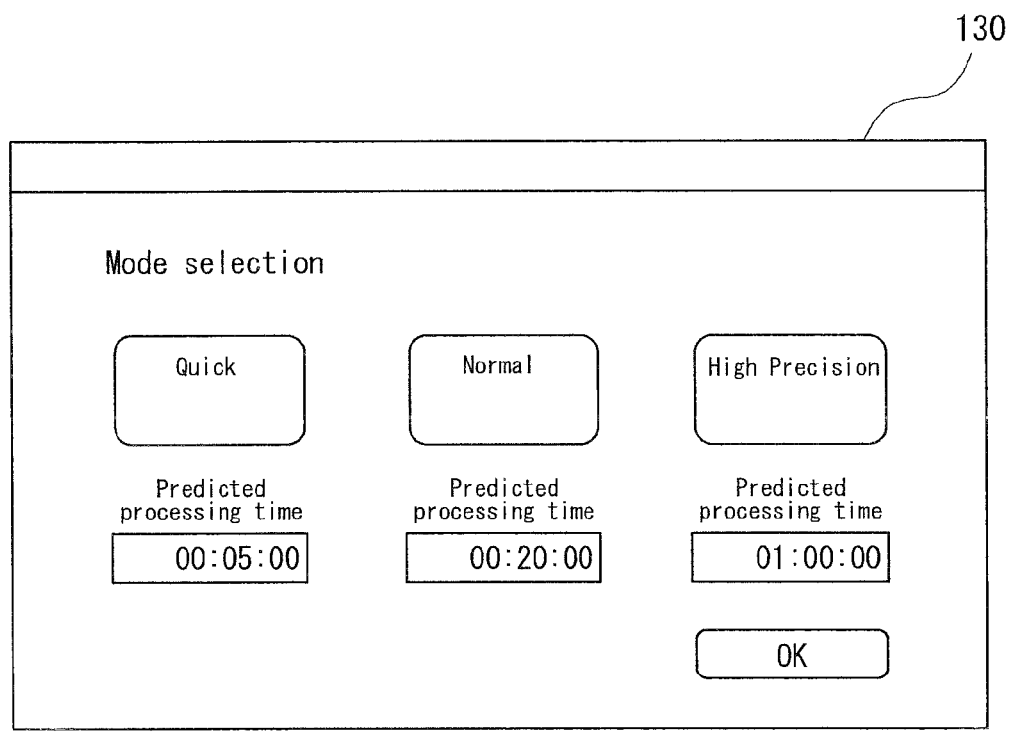
FIG. 13 is a view showing an example of a user requirement specifying display image.

For this purpose, the controller 170 causes the display portion 130 or a display portion for input, of the input portion 120, to display a user requirement specifying display image as shown in FIG. 13 in step S107. In this way, the controller 170 makes a user specify on dialog via the input portion 120 one of "Quick" mode for putting higher priority on processing time than precision, "Normal" mode for selecting normal precision and processing time, and "High Precision" mode for putting higher priority on precision than processing time. At this stage, the controller 170 causes the processing time calculation portion 144 to calculate predicted processing time periods corresponding to the "Quick", "Normal" and "High Precision" modes, respectively, according to the selected image processing method and photographing method, such that the results of the calculations are displayed on the user requirement specifying display image. The user requirement (mode) specified in step S107 is stored in the storage portion 150.

When "Normal" mode is specified in step S107, the controller 170 determines the image processing method and the photographing method selected in step S103 and step S105 as the image processing method and the photographing method to be executed, respectively. On the other hand, when "Quick" or "High Precision" mode is specified, the controller 170 causes the user requirement reflection portion 143 to reselect, based on the specified mode, a corresponding image processing method and/or a corresponding photographing method from the user requirement table 154 shown in FIG. 9(a) or FIG. 9(b) and determines the image processing method and/or the photographing method to be executed. In short, the controller 170 causes the user requirement specified by the user to be reflected such that appropriate image processing method and/or photographing method can be selected. The image processing method and/or the photographing method thus reselected is stored in the storage portion 150.

Next, the controller 170 causes the image acquisition controller 171 to control operations of the specimen photographing portion 110 based on the photographing method thus determined, so that the target specimen S is photographed and a target specimen image is acquired, to start analysis of the target specimen S (step S111). The image data of the target specimen image thus acquired is stored in the storage portion 150. After starting the analysis of the target specimen S, the controller 170 causes, according to necessity, the processing time calculation portion 144 to calculate remaining processing time obtained by subtracting the lapse time from the predicted processing time and causes the display portion 130 or the display portion for input, of the input portion 120, to display the results. Accordingly, the display portion 130 or the display portion for input, of the input portion 120, constitutes the processing time display portion.

The controller 170 then subjects the target specimen image thus acquired to image processing by the image processing method determined by the image processing portion 145 (step S113). The image data obtained by this image processing is stored in the storage portion 150.

Next, the controller 170 causes the image display method selection portion 146 to select an image display method from the image display method table 155 shown in FIG. 10 based on the image processing method thus determined (step S115). The image display method thus selected is stored in the storage portion 150.

The controller 170 then causes the display portion 130 to display the image which has been subjected to the image processing, based the image display method thus selected (step S117).

Further, the controller 170 causes the medical diagnosis support information acquisition portion 147 to acquire information to support medical diagnosis, based on the image which has been subjected to the image processing (step S119). The medical diagnosis support information thus acquired is stored in the storage portion 150. Further, according to necessity, the medical diagnosis support information is transmitted to a local medical system from the communication portion 180 or to an external diagnosis support server 190 or an external medical system via the network 181. Accordingly, the communication portion 180 also constitutes a medical diagnosis support information transmission portion in the present embodiment.

As described above, according to the medical diagnosis support device of the present embodiment, an image processing method and a photographing method which are the most suitable in terms of the identification information and a user's request for a target specimen S are automatically selected and the target specimen S is processed accordingly, whereby the most appropriate medical diagnosis support information can be obtained without causing the user so much trouble. As a result, unnecessary shooting can be avoided in a case where various target specimens are sequentially analyzed, whereby time required for shooting can be shortened and the memory capacity of the storage portion 150 can be decreases, as compared with the method of photographing all of the target specimens with high precision without considering the most appropriate image processing methods thereof.

(Second Embodiment)

Figure 14:
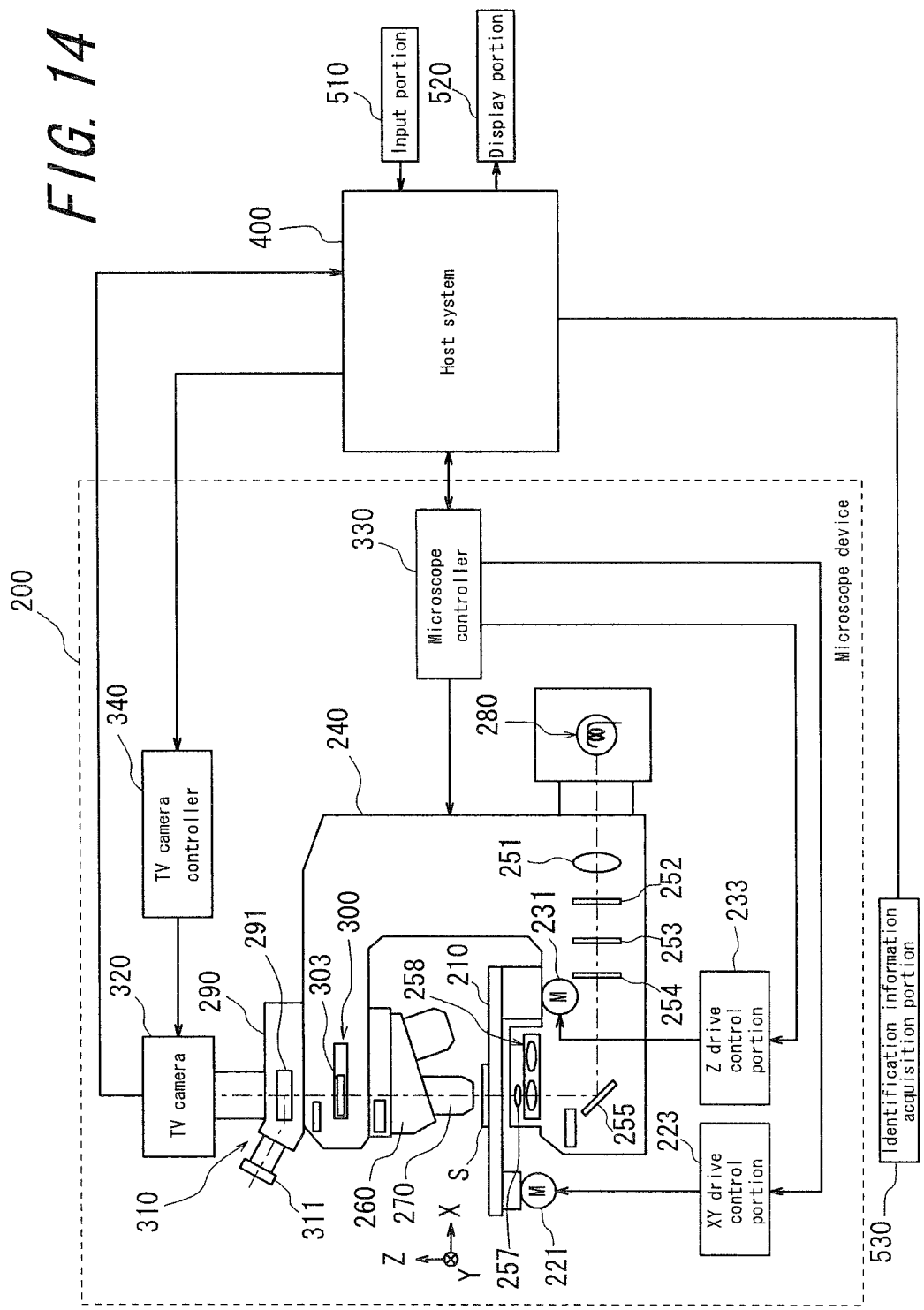
FIG. 14 is a view showing a structure of the main parts of a microscope device constituting a virtual microscope system according to a second embodiment, of the present invention.
Figure 15:
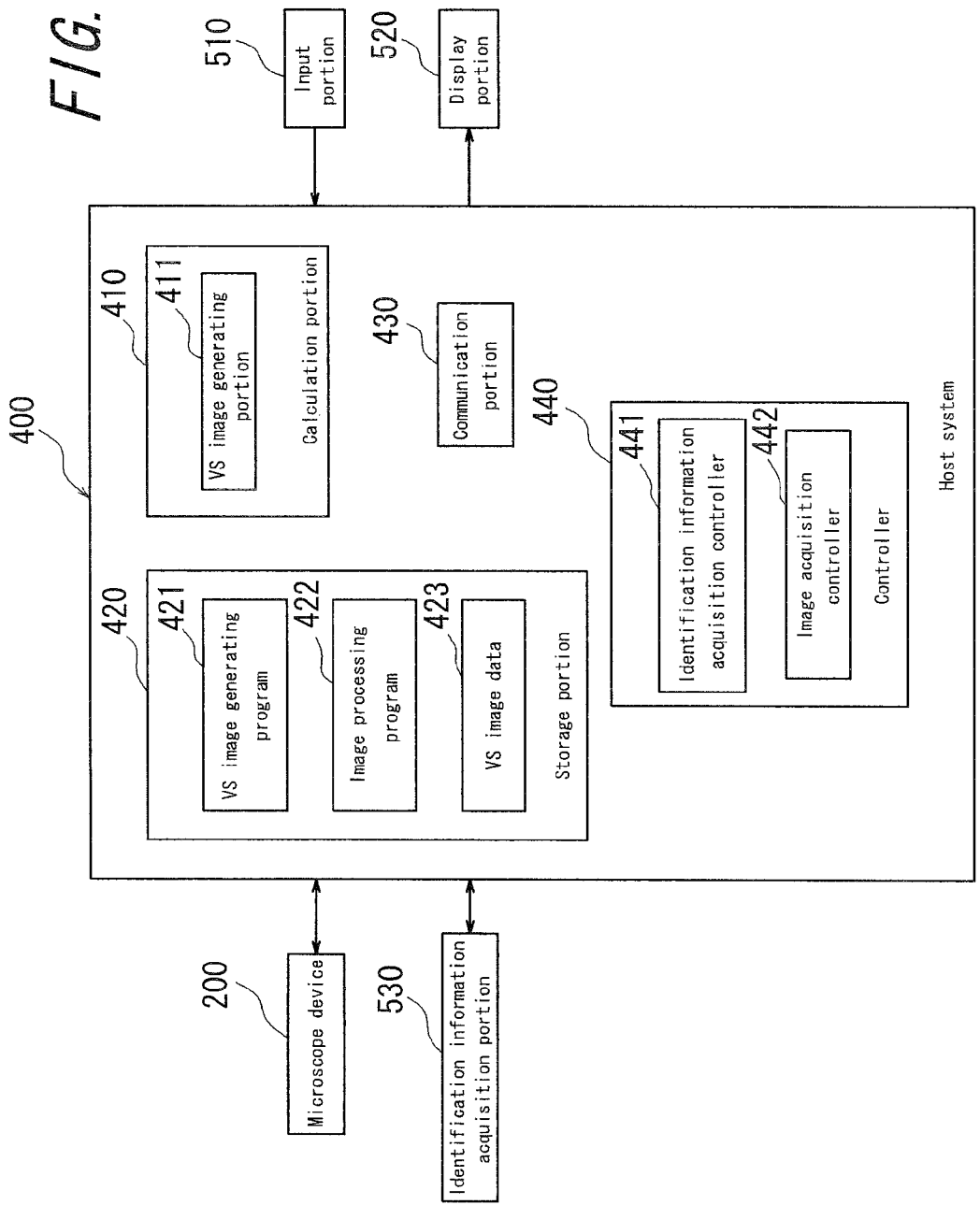
FIG. 15 is a block diagram showing a structure of the main parts of the host system shown in FIG. 14.

FIG. 14 and FIG. 15 are views each showing a structure of the main parts of a virtual microscope system according to a second embodiment of the present invention. This virtual microscope system has a function of the medical diagnosis support device described in the first embodiment and is provided with a host system 400, a microscope device 200 connected to the host system 400, an input portion 510 having, for example, a keyboard and a mouse, a display portion 520, and an identification information acquisition portion 530 such as a barcode reader. In the present embodiment, the microscope device 200 corresponds to the specimen photographing portion 110 in FIG. 1, the input portion 510 corresponds to the input portion 120 in FIG. 1, the display portion 520 corresponds to the display portion 130 in FIG. 1, and the identification information acquisition portion 530 corresponds to the identification information acquisition portion 160 in FIG. 1. FIG. 14 primarily shows a schematic structure of the microscope device 200 and FIG. 15 primarily shows a schematic structure of the host system 400.

As shown in FIG. 14, the microscope device 200 includes: an electrically driven stage 210 on which a target specimen S is placed; a microscope body 240 having a lied down U-like shape in side view for supporting the electrically driven stage 210 and holding by way of a revolver 260 objective lens 270 (corresponding to the optical system 114 in FIG. 2); a light source 280 disposed at the rear bottom of the microscope body 240; and an optical column 290 placed at the upper portion of the microscope body 240. The optical column 290 are provided with a binocular portion 310 for visually observing a specimen image of a target specimen S and a TV camera 320 for photographing the specimen image of the target specimen S. In the present embodiment, the optical axis of the objective lens 270 shown in FIG. 14 is defined as the Z direction and the planes normal to the Z direction are defined as the X, Y plane.

The electrically driven stage 210 is structured to be movable in the X, Y, Z directions. Specifically, the electrically driven stage 210 is movable within the XY plane by a motor 221 and a XY drive control portion 223 for controlling drive of the motor 221. The XY drive control portion 223 detects the predetermined origin position in the XY plane of the electrically driven state 210 by a XY position origin sensor (not shown) under control of a microscope controller 330 and controls a drive magnitude of the motor 221, with the origin position as the base point, so that an observation point on a target specimen S is shifted. The XY drive control portion 223 outputs the X position and the Y position of the electrically driven stage 210 during observation to the microscope controller 330 in an appropriate manner.

The electrically driven stage 210 is movable in the Z direction by a motor 231 and a Z drive control portion 233 for controlling drive of the motor 231. The Z drive control portion 233 detects the predetermined origin position in the Z direction of the electrically driven state 210 by a Z position origin sensor (not shown) under control of a microscope controller 330 and controls a drive magnitude of the motor 231, with the origin position as the base point, so that the target specimen S is focus-adjustingly shifted to any Z position within a predetermined height range. The Z drive control portion 233 outputs the Z position of the electrically driven stage 210 during observation to the microscope controller 330 in an appropriate manner.

The revolver 260 is held rotatable relative to the microscope body 240 and disposes an objective lens 270 above the target specimen S. The objective lens 270 is detachably mounted on the revolver 260 together with other objective lenses having different (observation) magnification rates and shifted to be located on the optical path of observation light in accordance with rotation of the revolver 260, so that an objective lens 270 for use in observation of the target specimen S is selectively switched.

The microscope body 240 includes therein an illumination optical system for illuminating the target specimen S with transmitted light at the bottom portion thereof. The illumination optical system includes a collector lens 251 for collecting illumination light emitted from the light source 280, an illumination system filter unit 252, a field stop 253, an aperture stop 254, a fold mirror 255 for deflecting the optical path of the illumination light along the optical path of the objective lens 270, a condenser optical element unit 256, a top lens unit 257, and the like, disposed at appropriate positions along the optical path of illumination light. Illumination light emitted from the light source 280 is irradiated on the target specimen S by the illumination optical system and the transmitted light is incident on the objective lens 270 as observation light. Accordingly, the light source 280 and the illumination optical system correspond to the illumination portion 113 in FIG. 2.

Further, the microscope body 240 includes therein a filer unit 300 at the upper portion thereof. The filter unit 300 holds at least two optical filters 303 rotatable to restrict a wavelength region of light to be imaged as a specimen image to a predetermined range. The optical filter 303 is moved to the optical path of observation light at a downstream position of the objective lens 270 in an appropriate manner. The filter unit 300 corresponds to the filter portion 115 shown in FIG. 2. Although a case where the optical filter 303 is disposed at a downstream position of the objective lens 270 is exemplified, the present embodiment is not restricted thereto and the optical filter 303 may be disposed at any position along the optical path from the light source 280 to the TV camera 320. The observation light through the objective lens 270 is incident on the optical column 290 via the filter unit 300.

The optical column 290 includes therein a beam splitter 291 for switching the optical path of the observation light from the filter unit 300 to introduce the light into the binocular portion 310 or the TV camera 320. A specimen image of the target specimen S is introduced into the binocular portion 310 by the beam splitter 291 and visually observed by an operator via an ocular lens 311. Alternatively, a specimen image of the target specimen S is photographed by the TV camera 320. The TV camera 320 is provided with an image pickup element such as a CCD, MOS for imaging a specimen image (specifically, a specimen image within the visual range of the objective lens 270), photographs a specimen image and outputs the image data of the specimen image to the host system 400. That is, the TV camera 320 corresponds to the RGB camera 111 shown in FIG. 2.

Further, the microscope 200 includes a microscope controller 330 and a TV camera controller 340. The microscope controller 330 comprehensively controls operations of the respective portions constituting the microscope device 200 under the control of the host system 400. For example, the microscope controller 330 carries out various adjustments of the respective portions of the microscope device 200 in association with observation of a target specimen S, which adjustments include: a process of rotating the revolver 260 to switch one objective lens 270 disposed on the optical path of observation light to another objective lens; light-adjusting control of the light source 280 and/or switching of various optical elements in accordance with a magnification rate or the like of the objective lens 270 thus switched; instructions to the XY drive control portion 223 and/or the Z drive control portion 233 to move the electrically driven stage 210; and the like. The microscope controller 330 also notifies the host system 400 of the state of various portions.

The TV camera controller 340 drives the TV camera 320 by carrying out ON/OFF switching of automatic gain control, setting of gain, ON/OFF switching of automatic exposure control, setting of exposure time, and the like, under the control of the host system 400, thereby controlling the photographing operations of the TV camera 320.

The host system 400 includes a calculation 410, a storage portion 420, a communication portion 430, and a controller 440 for controlling the respective portions thereof, as shown in FIG. 15. Although a functional structure of the host system 400 is shown in FIG. 15, the actual host system 400 can be realized by a known hardware structure including: a main storage device such as CPU, video board, main memory (RAM) and the like; an external storage device such as hard disc, various memory medium, and the like; a communication device; and an interface device for effecting connection with an external input; and the like. For example, a general purpose computer such as a work station and a personal computer can be utilized as the host system.

In FIG. 15, the calculation portion 410 includes, in addition to the function of the calculation portion 140 of FIG. 1, a VS image generating portion 411 having an image synthesizing function for generating a virtual slide (VS) image from an image which has been subjected to image processing.

The VS image generating portion 411 appropriately processes plural target specimen images obtained by multiband-photographing respective parts of a target specimen S, thereby generating a VS image. In the present embodiment, a VS image is an image generated by patching at least one image(s) which has been multiband-photographed by the microscope device 200 and, for example, represents an image generated by patching plural high-resolution images obtained by photographing respective parts of a target specimen S by using a high-magnification objective lens 270, which image is a wide-field and highly precise multiband image covering the entire region of the target specimen S.

The storage portion 420 is realized by: various IC memory like a memory-updatable flush memory such as ROM or RAM; an information storage medium such as a CD-ROM and a hard disc installed or connected by way of a data communication terminal; and an information storage medium reading device, and has the function of the storage portion 150 of FIG. 1. Further, a program for operating the host system 400 to realize various functions provided in the host system 400, data for use when the program is executed, and the like are stored in the storage portion 420.

The storage portion 420 stores, for example, an image processing program 422 including a VS image generating program 421, and a VS image data (multiband image data) 423. In the present embodiment, the VS image generating program 421 is a program for realizing a process of generating a VS image of a target specimen S. Further, The VS image date 423 is, for example, image data of the entire region of a target specimen S generated by patching respective image data of the target specimen image acquired by the microscope device 200 photographing respective parts of the target specimen.

The communication portion 430 has the function of the communication portion 180 of FIG. 1 and, as in the first embodiment, downloads the latest image processing method and/or photographing method from an external diagnosis support server 190 via the network 181, transmits, according to necessity, information to support medical diagnosis and a VS image acquired by the virtual microscope system to a local medical system or an external diagnosis support server 190 and/or an external medial system via the network 181 (see FIG. 1).

The controller 440 corresponds to the controller 170 of FIG. 1 and is realized by hardware such as CPU. The controller 440 includes an identification information acquisition controller 441 for controlling operations of the identification information acquisition portion 530 to acquire identification information of a target specimen S and an image acquisition controller 442 for controlling operations of the respective portions of the microscope device 200 to acquire target specimen multiband images obtained by photographing respective parts of the target specimen S. The controller 440, for example, forwards instructions, effects transfer of data to the respective portions constituting the host system 400 and/or controls operations of the respective portions of the microscope device 200 with respect to the microscope controller 330 and the TV camera controller 340, based on identification information obtained from the identification information acquisition portion 530, an input signal inputted from the input portion 510, the states of the respective portions of the microscope device 200 inputted from the microscope controller 330, image data inputted from the TV camera 320, the program and data stored in the storage portion 500, and the like, to comprehensively control the operations of the virtual microscope system as a whole.

According to the virtual microscope system of the present embodiment, not only there can be obtained an effect similar to the effect of the medical diagnosis support device of the first embodiment but also a VS image allowing improved accuracy of diagnosis can be provided.

(Third Embodiment)

Figure 16:
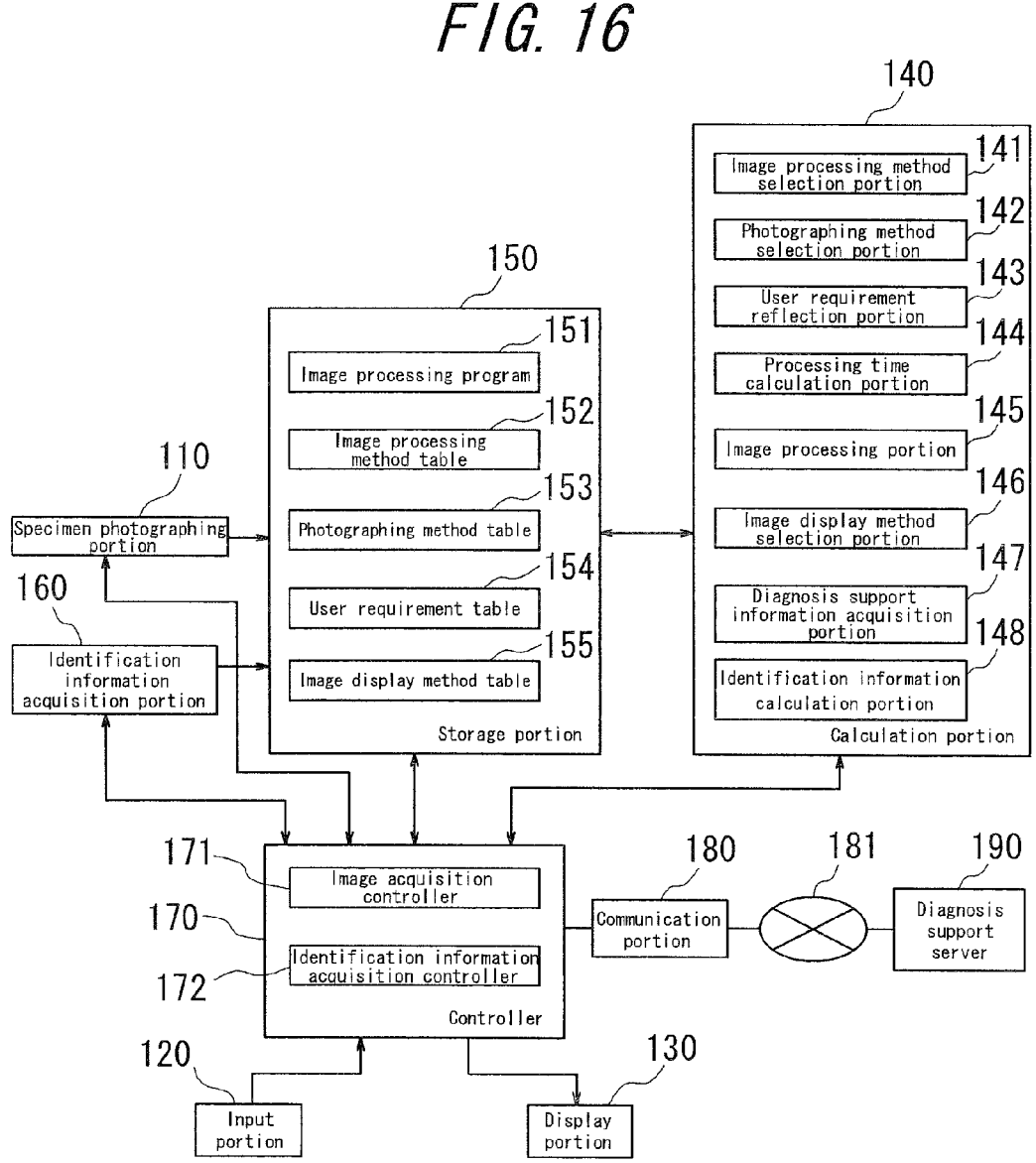
FIG. 16 is a block diagram showing a functional constitution of main parts of a medical diagnostics support device according to a third embodiment of the present invention.

FIG. 16 is a block diagram showing a functional constitution of main parts of a medical diagnostics support device according to a third embodiment of the present invention. The medical diagnosis support device of the present embodiment is substantially the same as the medical diagnosis support device shown in FIG. 1, except that an identification information calculation portion 148 is added to the calculation portion 140 in the former. Since other structures of the medical diagnosis support device in FIG. 16 is substantially the same as those shown in FIG. 1, the same structural components having the same effects are designated by the same reference numbers and detailed explanations thereof will be omitted.

The identification information calculation portion 148 calculates identification information of a specimen from a specimen image for acquiring identification information, which specimen image is acquired by photographing the specimen according to a predetermined photographing method.

Figure 17:
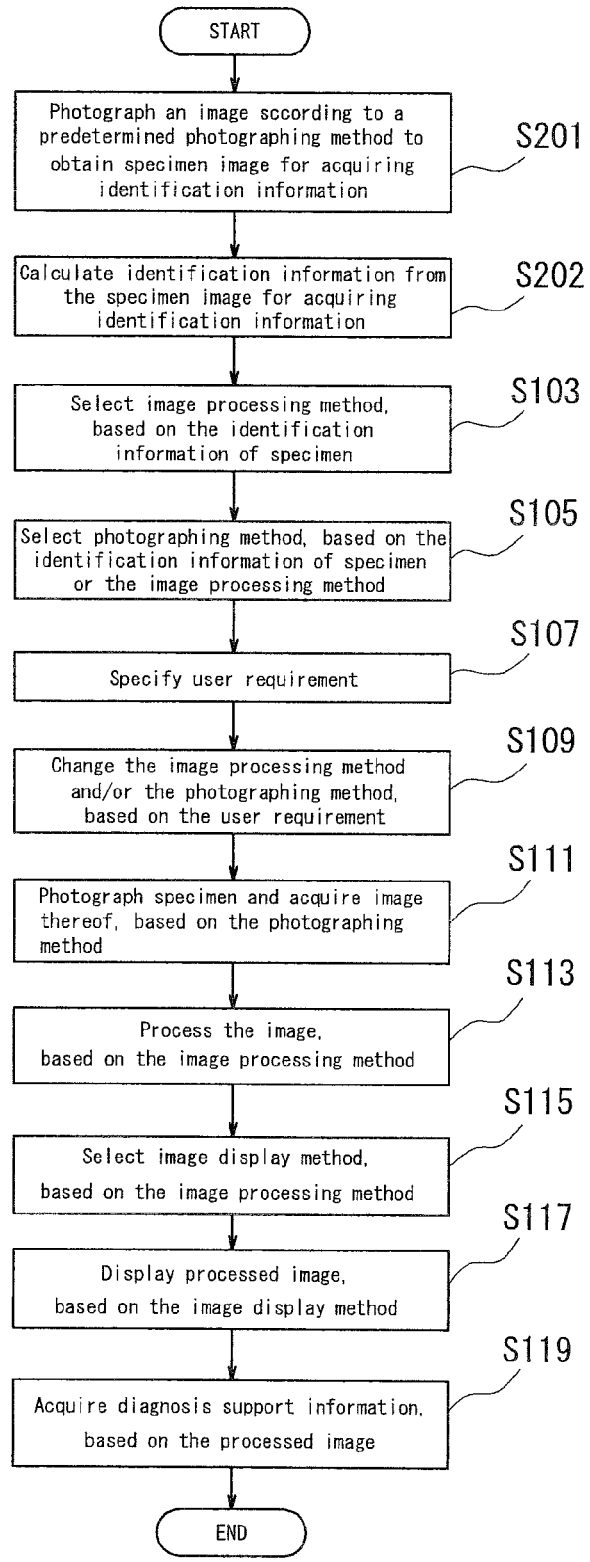
FIG. 17 is a flow chart showing outline of operations of the medical diagnosis support device shown in FIG. 16.

Hereinafter, the outline of operations of the medical diagnosis support device of the present embodiment will be described with reference to a flowchart shown in FIG. 17. First, the controller 170 controls operations of the specimen photographing portion 110 by, for example, the image acquisition controller 171 according to a predetermined photographing method, whereby a target specimen S is photographed and a specimen image for acquiring identification information is obtained (step S201). The specimen image for acquiring identification information thus obtained is stored in the storage portion 150. The shooting in step S201 can be carried out at lower magnification rate than the magnification rate in the main shooting because a specimen image for acquiring identification information obtained in step S201 is simply an image for determining the shooting conditions of the main shooting carried out at a relatively high magnification rate in step S111 later.

Next, the controller 170 causes the identification information calculation portion 148 to calculate identification information, based on the specimen image for acquiring identification information. Examples of the calculation method include judging the staining method, based on color distribution of an image. Specifically, it is compared and judged to which color distribution of HE stain, HE.VB stain and HE.DAB stain the color distribution of a target specimen matches best in color space.

Steps S103 to S119 are carried out, as in the first embodiment, by using the identification information thus calculated.

As described above, according to the medical diagnosis support device of the present embodiment, identification information of a target specimen S is acquired from a specimen image, whereby, even in a specimen on which identification information has not been provided, the image processing method and the photographing method which are the most suitable to the specimen are automatically selected and thus the most suitable medical diagnosis support information can be obtained. In the aforementioned case, the identification information acquisition portion 160 may be omitted because identification information is obtained from a specimen image.

(Fourth Embodiment)

Figure 18:
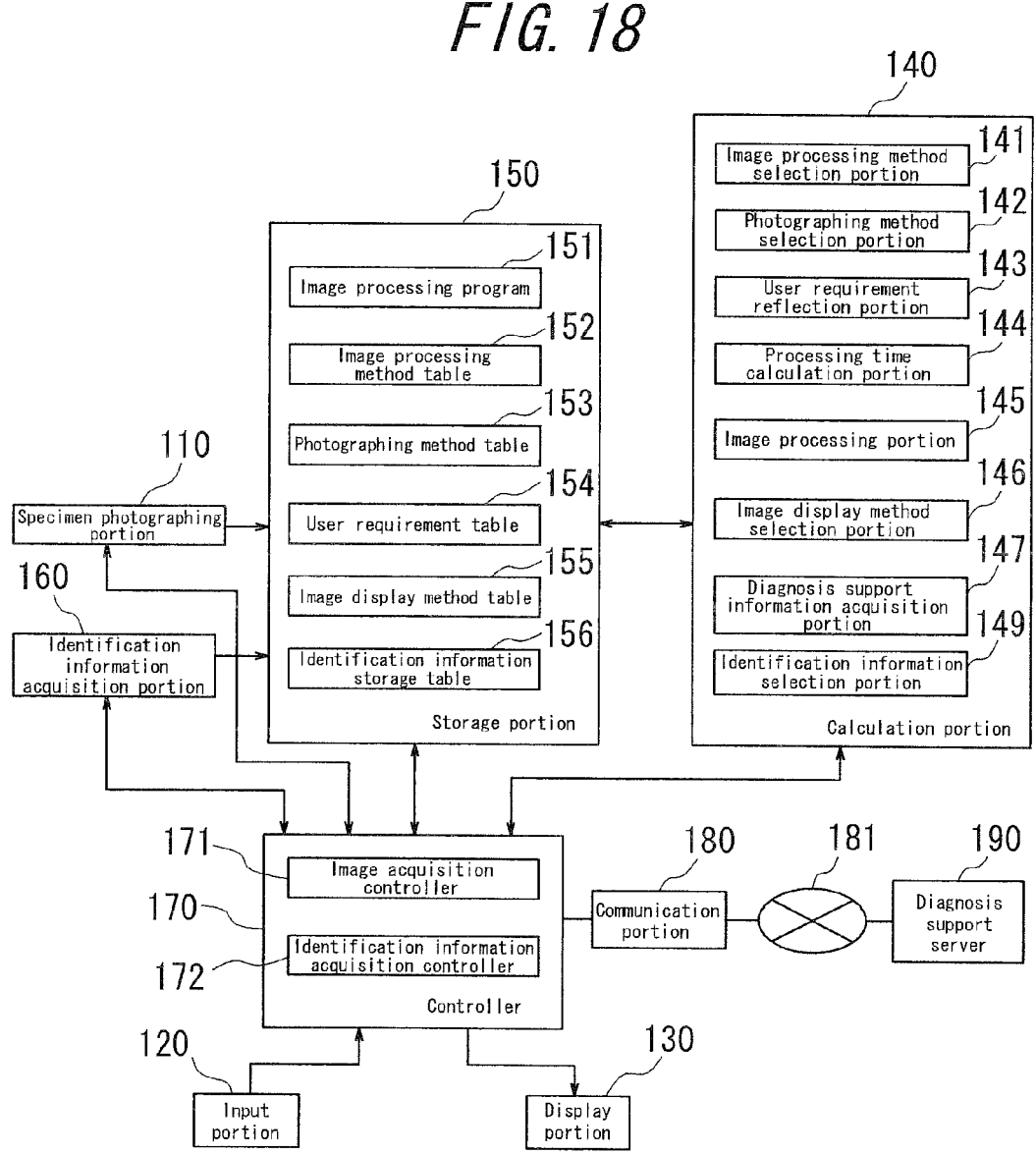
FIG. 18 is a block diagram showing a functional constitution of main parts of a medical diagnostics support device according to a fourth embodiment of the present invention.

FIG. 18 is a block diagram showing a functional constitution of main parts of a medical diagnosis support device according to a fourth embodiment of the present invention. The medical diagnosis support device of the present embodiment is substantially the same as the medical diagnosis support device shown in FIG. 1, except that an identification information selection portion 149 and an identification information storage table 156 are added to the calculation portion 140 and the storage portion 150, respectively, in the former. Since other structures of the medical diagnosis support device in FIG. 18 is substantially the same as those shown in FIG. 1, the same structural components having the same effects are designated by the same reference numbers and detailed explanations thereof will be omitted.

The identification information selection portion 149 selects, from identification information stored in an identification information storage portion, identification information corresponding to an individual identification number obtained from a specimen.

The identification information storage table 156 constitutes the identification information storage portion and stores data showing a list of specimen information including individual numbers, staining methods, organs, and the like of respective specimens as shown in FIG. 19. The associations or relationships as exemplarily shown in FIG. 19 are managed by using, for example, a known database administration tool. The data structures of the tables are not restricted to the shown examples and other structures are acceptable as longs as the structures enable, by specification of attribute values of respective attribute items, acquisition of characteristics data in accordance with the attribute values.

Hereinafter, the outline of operations of the medical diagnosis support device of the present embodiment will be described with reference to a flowchart shown in FIG. 20. First, the controller 170 causes, for example, the specimen photographing portion 110 or the identifying information acquisition portion 160 to acquire the individual number of a target specimen S (step S301).

Next, the controller 170 causes the identification information selection portion 149 of the calculation portion 140 to select identification information corresponding to the individual number from the identification information storage table 156 (step S302).

Steps S103 to S119 are carried out, as in the first embodiment, by using the identification information thus selected.

As described above, according to the medical diagnosis support device of the present embodiment, identification information of a target specimen S is acquired from individual information, whereby it is unnecessary to provide the specimen itself with identification information. Accordingly, the image processing method and the photographing method which are the most suitable to the specimen are automatically selected and thus the most suitable medical diagnosis support information can be obtained without providing a specimen with identification information thereof.

(Fifth Embodiment)

Figure 21:
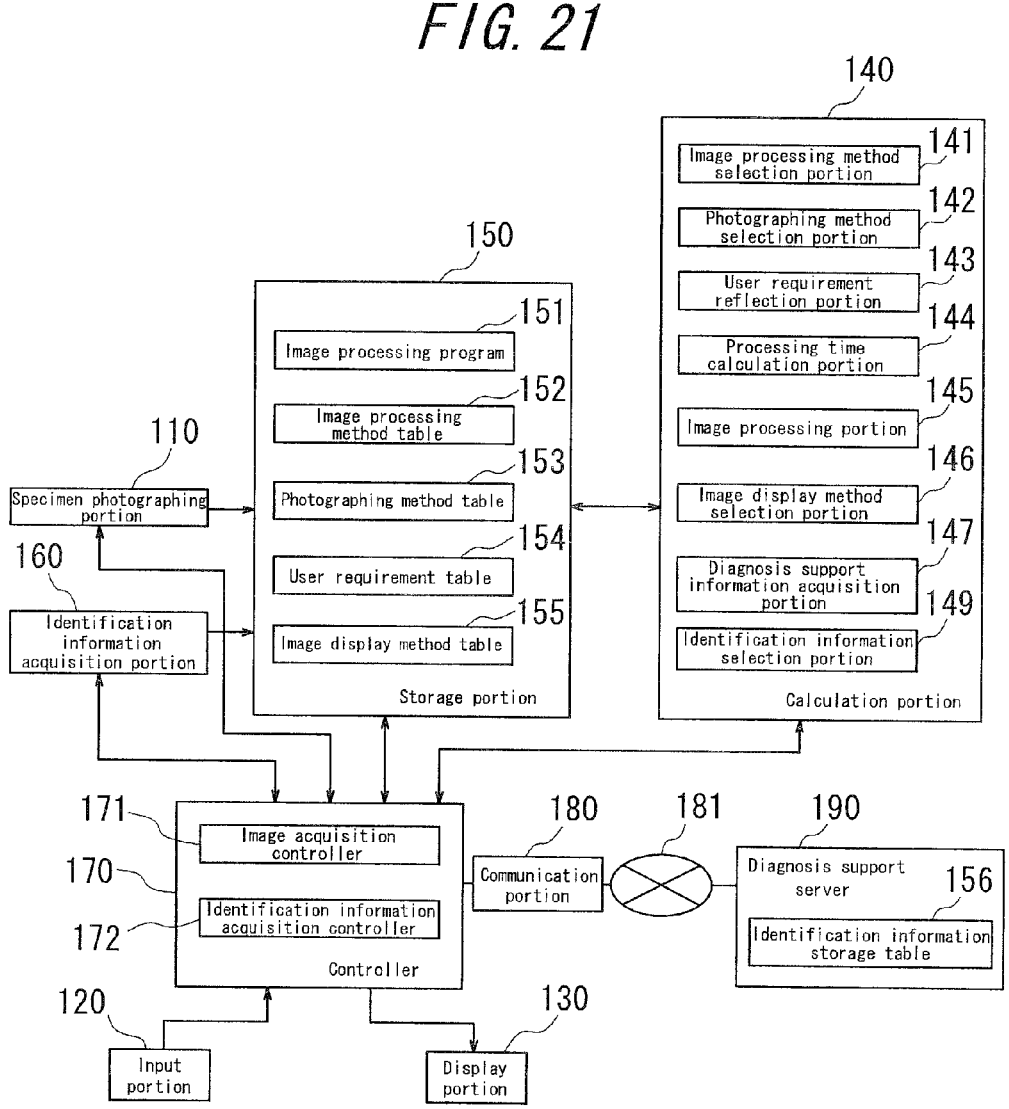
FIG. 21 is a block diagram showing a functional constitution of main parts of a medical diagnostics support device according to a fifth embodiment of the present invention.

FIG. 21 is a block diagram showing a functional constitution of main parts of a medical diagnostics support device according to a fifth embodiment of the present invention. The medical diagnosis support device of the present embodiment is substantially the same as the medical diagnosis support device shown in FIG. 1, except that an identification information selection portion 149 and an identification information storage table 156 are added to the calculation portion 140 and the diagnosis support server 190, respectively, in the former. Since other structures of the medical diagnosis support device in FIG. 21 is substantially the same as those shown in FIG. 1, the same structural components having the same effects are designated by the same reference numbers and detailed explanations thereof will be omitted.

The communication portion 180 communicates with the server by way of a network, and the identification information selection portion 149 selects identification information corresponding to the individual number obtained from the specimen, from the server via the network through the communication portion 180.

The identification information storage table 156 stores data showing a list of specimen information including individual numbers, staining methods, organs, and the like of respective specimens as shown in FIG. 19.

Figure 20:
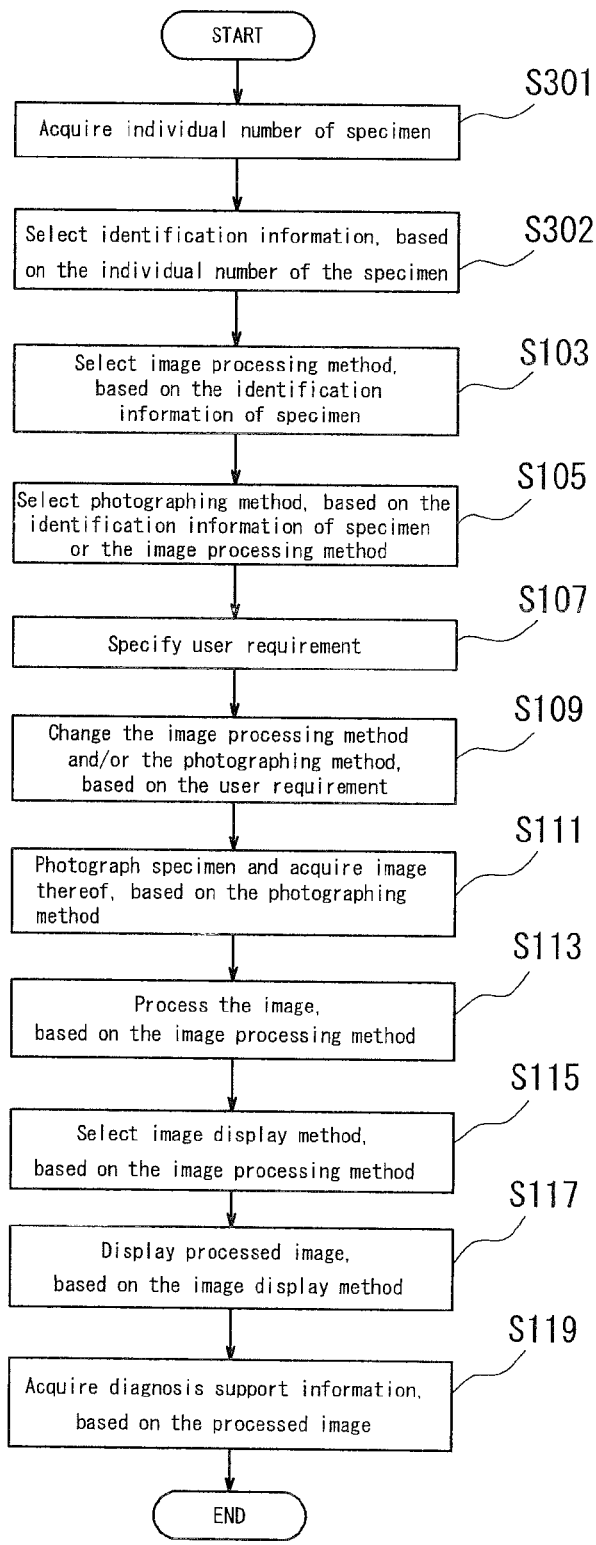
FIG. 20 is a flow chart showing outline of operations of the medical diagnosis support device shown in FIG. 18.

In the outline of operations of the medical diagnosis support device of the present embodiment, step S301, S302 and S103 to S119 are carried out as in the fourth embodiment shown in FIG. 20.

As described above, according to the medical diagnosis support device of the present embodiment, identification information of a target specimen S is acquired from individual information, whereby it is unnecessary to provide the specimen itself with identification information. Accordingly, the image processing method and the photographing method which are the most suitable to the specimen are automatically selected and thus the most suitable medical diagnosis support information can be obtained without providing a specimen with identification information thereof.

(Sixth Embodiment)

Figure 22:
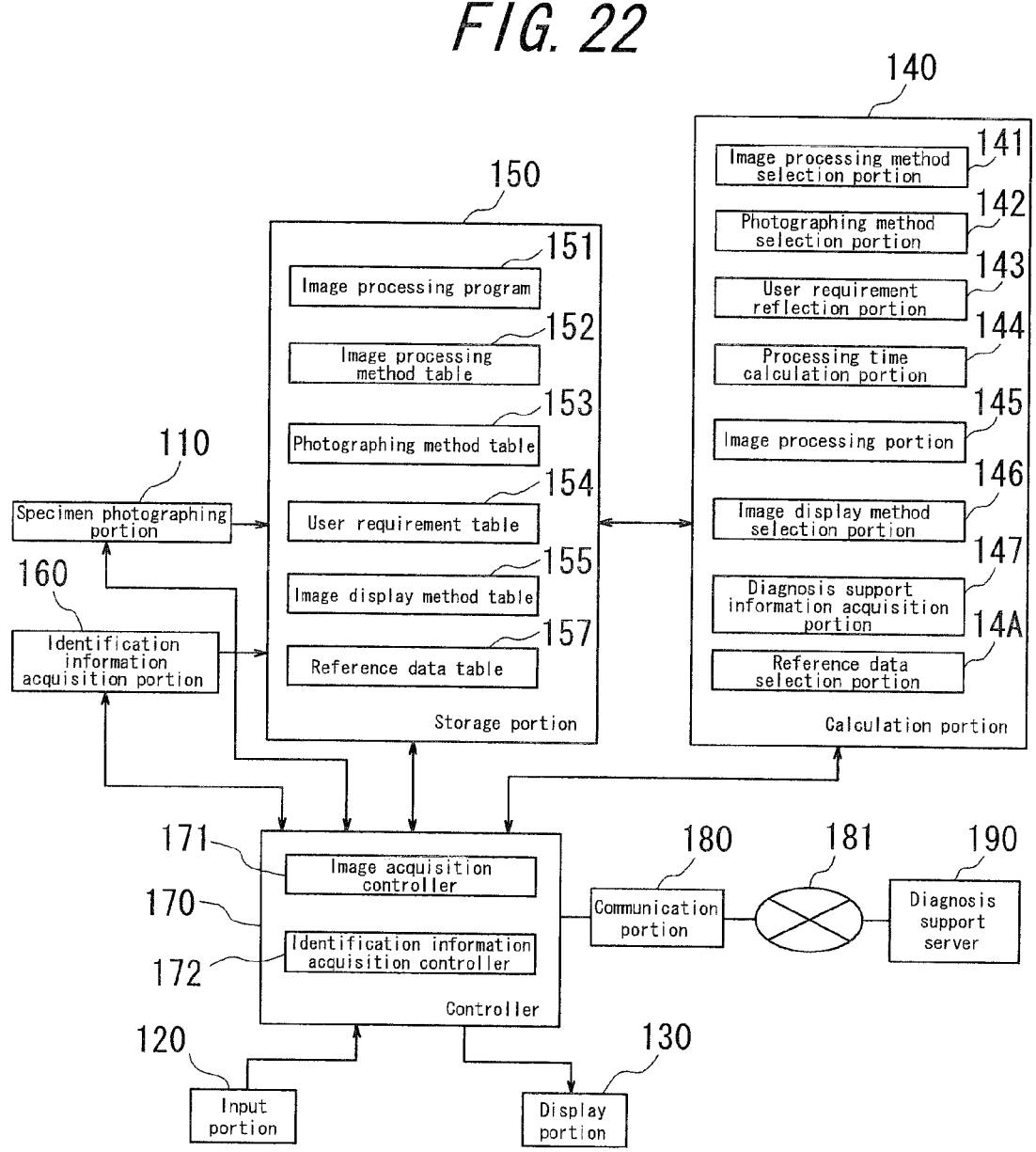
FIG. 22 is a block diagram showing a functional constitution of main parts of a medical diagnostics support device according to a sixth embodiment of the present invention.

FIG. 22 is a block diagram showing a functional constitution of main parts of a medical diagnostics support device according to a sixth embodiment of the present invention. The medical diagnosis support device of the present embodiment is substantially the same as the medical diagnosis support device shown in FIG. 1, except that a reference data selection portion 14A and a reference data table 157 are added to the calculation portion 140 and the storage portion 150, respectively, in the former. Since other structures of the medical diagnosis support device in FIG. 22 is substantially the same as those shown in FIG. 1, the same structural components having the same effects are designated by the same reference numbers and detailed explanations thereof will be omitted.

The reference data selection portion 14A selects, based on the identification information acquired by the identification information acquisition portion 160 and the image processing method selected by the image processing method selection portion 146, corresponding reference data from plural sets of reference data stored in a reference data storage portion.

The reference data table 157 constitutes the reference data storage portion and stores data showing: a list of statistical data for use in spectral estimation process associated with organs, as show in FIG. 23(a); a list of spectra of pigments for use in pigment quantity estimation process associated with staining methods, as shown in FIG. 23(b); and a list of learning data for use in digital staining process or specific region judging process associated with organs, as shown in FIG. 23(c).

Figure 24:
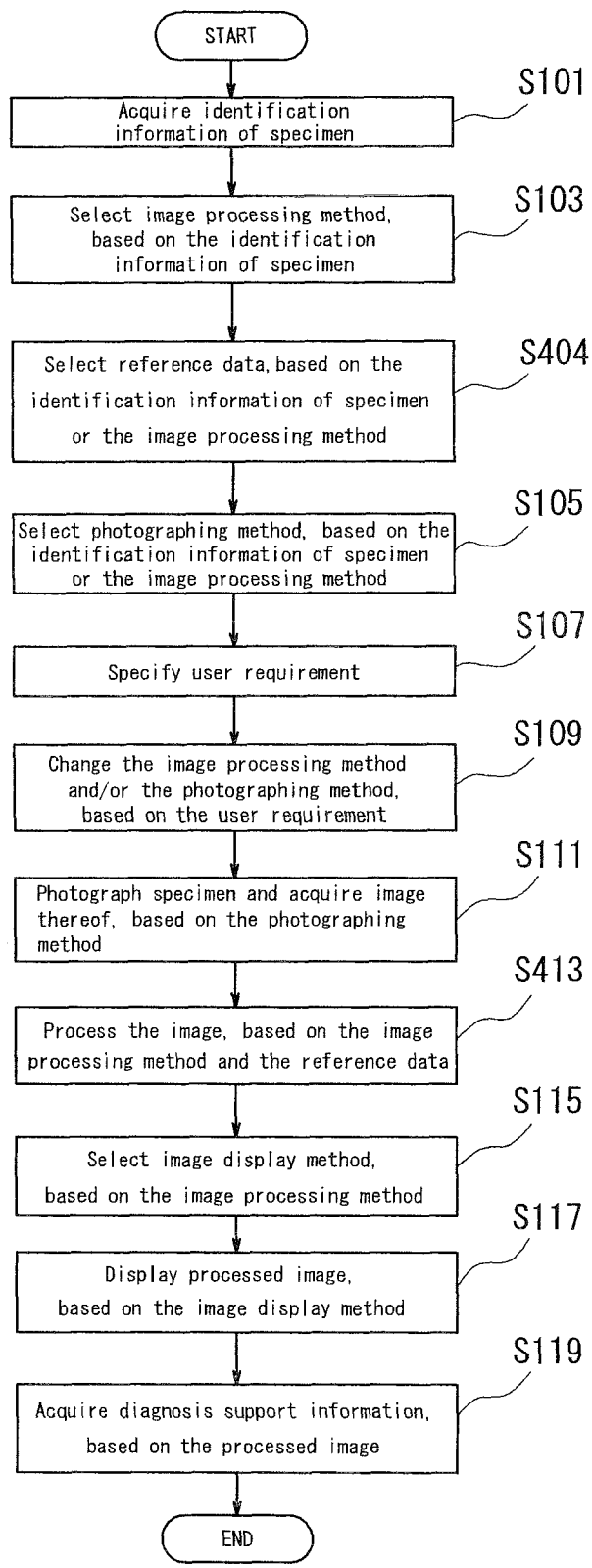
FIG. 24 is a flow chart showing outline of operations of the medical diagnosis support device shown in FIG. 22.

Hereinafter, the outline of operations of the medical diagnosis support device of the present embodiment will be described with reference to a flowchart shown in FIG. 24. First, the controller 170 controls operations of the identification information acquisition portion 160 by the identification information acquisition controller 172, whereby identification information of a target specimen S is acquired (step S101).

Next, the controller 170 causes the image processing method selection portion 141 of the calculation 140 to select an image processing method from the image processing method table 152 of the storage portion 150 based on the features of the diagnosis method, the staining method or the organ included in the identification information (step S103).

The controller 170 then causes the reference data selection portion 14A to select, based on the identification information and the image processing method selected by the image processing method selection portion 141, corresponding reference data from the reference data storage table 157 of the storage portion 150 (step S404).

The controller 170 then causes the photographing method selection portion 142 to select a photographing method corresponding to "Normal" mode from the photographing method table 153 of the storage portion 150, based on the image processing method selected by the image processing method selection portion 141 (step S105). The photographing method thus selected is stored in the storage portion 150.

Thereafter, the controller 170 receives via the input portion 120 the user requirement specified by a user (step S107) and determines the image processing method and the photographing method thus selected or changes the image processing method and the photographing method by the user requirement reflection portion 143, based on the specified user requirement (step S109).

Next, the controller 170 causes the image acquisition controller 171 to control operations of the specimen photographing portion 110 based on the photographing method thus determined, so that the target specimen S is photographed and a target specimen image is acquired, to start analysis of the target specimen S (step S111).

Thereafter, the controller 170 subjects the acquired target specimen image to image processing, based on the reference data and the image processing method determined by the image processing portion 145 (step S413). The image data thus subjected to image processing is stored in the storage portion 150.

Step S115 to S119 are then carried out as in the first embodiment.

As described above, according to the medical diagnosis support device of the present embodiment, reference data, in addition to the most suitable image processing method and photographing method, is automatically selected for a target specimen S based on the identification information thereof, so that processing is carried out based on the reference data. Accordingly, image processing can be carried out in the most appropriate condition.

The present invention is not restricted to the foregoing embodiments and various modifications or changes may be made thereto. For example, a known specimen staining means may be added in each of the foregoing embodiments. In this case, it is possible to automatically carry out a series of processes including staining, image photographing, image processing, acquiring information to support medical diagnosis, and the like.

Further, data of identification information, photographing methods and image processing methods stored in the storage portion may be bound to one file as job data, as shown e.g. FIG. 16, in the foregoing embodiments. In this case, the storage portion constitutes a job data storage portion, as well. The job data in FIG. 16 shows an example including job number, user requirement mode, photographed image, processed image, displaying method and medical diagnosis support information. Job numbers may be numbers unique to respective jobs, by which the respective jobs can be identified. Jobs can be unequivocally managed in this way.

Yet further, in the foregoing embodiments, there may be further provided: a specimen holding portion for setting plural specimens; an auto-loading mechanism for automatically and sequentially supplying the plural specimens held in the specimen holding portion to the specimen photographing portion via the identification information acquisition portion; and an auto-unloading mechanism for automatically collecting the specimen for which image acquisition is completed, from the specimen photographing portion, so that plural specimens are automatically and sequentially analyzed. In this case, it is possible to parallel-operate the identification information acquisition portion, the specimen photographing portion and the calculation portion.

Further, in the foregoing embodiments, it is possible to eliminate in an appropriate manner any of the structural requirement related to a user requirement specification, the structural requirement related to processing time calculation and/or display, the structural requirement related to the communication portion, the image display method and/or image display, and the structural requirement related to acquisition of diagnosis support information. For example, in a case where the structural requirement related to a user requirement specification is eliminated, such elimination can be compensated by processing in "Normal" mode by using an image processing method table 152 and the photographing method table 153 described in the first embodiment. In a case where the structural requirement related to the image display method and/or image display is eliminated or a case where the structural requirement related to acquisition of diagnosis support information is eliminated, such elimination can be compensated by employing a structure enabling storing the image data subjected to image processing in the storage portion and providing the stored image data as image data for supporting diagnosis either via the communication portion or directly without using the communication portion. Yet further, identification information for identifying a target specimen S is not limited to a one-dimensional barcode but may be recorded as a two-dimensional matrix barcode such as QR Code® or a two-dimensional stacked barcode. A larger amount of information can be recorded by using a two-dimensional barcode as described above, whereby increase in identification information of diagnosis methods, staining methods, organs, and the like of a target specimen S can be easily addressed.

What is claimed is:

1. A medical diagnosis support device for analyzing a specimen, comprising:
   an image processing method storage portion for memorizing plural types of image processing methods;
   a photographing method storage portion for memorizing plural types of photographing methods;
   an identification information acquisition portion for acquiring identification information of the specimen;
   a processor;
   a memory storing computer readable instructions that, when executed by the processor, implement:
   (i) an image processing method selection portion for selecting, based on the identification information acquired by the identification information acquisition portion, a corresponding image processing method from the plural types of image processing methods stored in the image processing method storage portion; and
   (ii) a photographing method selection portion for selecting, based on the identification information acquired by the identification information acquisition portion or the image processing method selected by the image processing method selection portion, a corresponding photographing method from the plural types of photographing methods stored in the photographing method storage portion; and
   a specimen photographing portion for photographing the specimen according to the photographing method selected by the photographing method selection portion, to acquire a specimen image;
   the computer readable instructions, when executed by the processor, further implement:
   (i) an image processing portion for subjecting the specimen image acquired by the specimen photographing portion, to image processing, according to the image processing method selected by the image processing method selection portion; and
   (ii) a processing time calculation portion for calculating, based on the photographing method selected by the photographing method selection portion and the image processing method selected by the image processing method selection portion, predicted processing time required at least from the start of photographing of the specimen by the specimen photographing portion to the completion of image processing by the image processing portion.

2. The medical diagnosis support device of claim 1, wherein the processing time calculation portion is adapted to calculate remaining processing time, of the predicted processing time, during analysis of the specimen.

3. The medical diagnosis support device of claim 1, further comprising a processing time display portion for displaying the processing time calculated by the processing time calculation portion.

\* \* \* \* \*